US012192647B2

(12) United States Patent
Kaizu et al.

(10) Patent No.: US 12,192,647 B2
(45) Date of Patent: *Jan. 7, 2025

(54) SIGNAL PROCESSING DEVICE, SIGNAL PROCESSING METHOD, AND DETECTION SENSOR

(71) Applicant: SONY GROUP CORPORATION, Tokyo (JP)

(72) Inventors: Shun Kaizu, Kanagawa (JP); Takahiro Miyazaki, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 17/927,791

(22) PCT Filed: May 21, 2021

(86) PCT No.: PCT/JP2021/019303
§ 371 (c)(1),
(2) Date: Nov. 25, 2022

(87) PCT Pub. No.: WO2021/246194
PCT Pub. Date: Dec. 9, 2021

(65) Prior Publication Data
US 2023/0217117 A1    Jul. 6, 2023

(30) Foreign Application Priority Data
Jun. 4, 2020  (JP) .................. 2020-097452

(51) Int. Cl.
*H04N 23/745* (2023.01)
*H04N 23/71* (2023.01)

(52) U.S. Cl.
CPC ........... *H04N 23/745* (2023.01); *H04N 23/71* (2023.01)

(58) Field of Classification Search
CPC ...... H04N 23/745; H04N 23/71; H04N 25/47; H04N 25/60
See application file for complete search history.

(56) References Cited

U.S. PATENT DOCUMENTS

2018/0032150 A1   2/2018 Lee
2021/0044744 A1   2/2021 Sironi et al.
(Continued)

FOREIGN PATENT DOCUMENTS

EP    3518529 A1    7/2019
JP    2004007402 A   1/2004
(Continued)

*Primary Examiner* — Twyler L Haskins
*Assistant Examiner* — Angel L Garces-Rivera
(74) *Attorney, Agent, or Firm* — Paratus Law Group, PLLC

(57) ABSTRACT

There is provided a signal processing device, a signal processing method, and a detection sensor that enable detection of flicker information from an output indicating a luminance change. The signal processing device includes: a count unit that counts a first count number, which is a count number of pixels in which a first luminance change in a positive direction is detected, and a second count number, which is a count number of pixels in which a second luminance change in a negative direction is detected, in an image output from a light receiving unit at a predetermined frame rate and indicating a luminance change; a coefficient generation unit that generates a coefficient corresponding to a time at which the luminance change is detected; and an integrating unit that integrates a multiplication result of the count number of the pixels and the coefficient. The present technology can be applied to, for example, an event detection sensor or the like.

16 Claims, 29 Drawing Sheets

(56) References Cited

U.S. PATENT DOCUMENTS

2021/0385402 A1   12/2021   Zhu
2024/0114255 A1*  4/2024   Kaizu .................... H04N 25/47

FOREIGN PATENT DOCUMENTS

| JP | 2017-535999 A | 11/2017 |
| JP | 2018022490 A | 2/2018 |
| JP | 2020072471 A | 5/2020 |
| WO | WO 2019/135303 A1 | 7/2019 |

* cited by examiner

FIG. 20

321 LIGHT RECEIVING CHIP

342 VIA ARRANGEMENT UNIT

341 LIGHT RECEIVING UNIT

342 VIA ARRANGEMENT UNIT

342 VIA ARRANGEMENT UNIT

343

| SHARED BLOCK | SHARED BLOCK | ... |
| SHARED BLOCK | SHARED BLOCK | |

343

| LOGARITHMIC RESPONSE UNIT | LOGARITHMIC RESPONSE UNIT — 351 |
| LOGARITHMIC RESPONSE UNIT | LOGARITHMIC RESPONSE UNIT |

SIGNAL PROCESSING DEVICE, SIGNAL PROCESSING METHOD, AND DETECTION SENSOR

CROSS REFERENCE TO PRIOR APPLICATION

This application is a National Stage Patent Application of PCT International Patent Application No. PCT/JP2021/019303 (filed on May 21, 2021) under 35 U.S.C. § 371, which claims priority to Japanese Patent Application No. 2020-097452 (filed on Jun. 4, 2020), which are all hereby incorporated by reference in their entirety.

TECHNICAL FIELD

The present technology relates to a signal processing device, a signal processing method, and a detection sensor, and more particularly, to a signal processing device, a signal processing method, and a detection sensor capable of detecting flicker information from an output of an event detection sensor that detects presence or absence of a luminance change at a constant cycle.

BACKGROUND ART

There has been proposed an image sensor which, with a change in luminance of pixels as an event, periodically outputs whether or not the event has occurred at a constant frame rate (see, for example, Patent Document 1).

CITATION LIST

Patent Document

Patent Document 1: Japanese Published Patent Publication No. 2017-535999

SUMMARY OF THE INVENTION

Problems to be Solved by the Invention

In such an event detection sensor that detects the presence or absence of a luminance change at a constant cycle, when a luminance change occurs on the entire screen, and many events occur, for example, in a case where a light source in a room flickers, an event that is originally desired to be acquired is buried in many events caused by the flicker, and information that is originally desired to be acquired cannot be captured.

The present technology has been made in view of such a situation, and enables detection of flicker information from an output of an event detection sensor that detects the presence or absence of a luminance change at a constant cycle.

Solutions to Problems

A signal processing device according to a first aspect of the present technology includes: a count unit that counts a first count number, which is a count number of pixels in which a first luminance change in a positive direction is detected, and a second count number, which is a count number of pixels in which a second luminance change in a negative direction is detected, in an image output from a light receiving unit at a predetermined frame rate and indicating a luminance change; a coefficient generation unit that generates a coefficient corresponding to a time at which the luminance change is detected; and an integrating unit that integrates a multiplication result of the count number of the pixels and the coefficient.

In a signal processing method according to the first aspect of the present technology, the signal processing device performs: counting a first count number, which is a count number of pixels in which a first luminance change in a positive direction is detected, and a second count number, which is a count number of pixels in which a second luminance change in a negative direction is detected, in an image output from a light receiving unit at a predetermined frame rate and indicating a luminance change; generating a coefficient corresponding to a time at which the luminance change is detected; and integrating a multiplication result of the count number of the pixels and the coefficient.

In the first aspect of the present technology, a first count number, which is a count number of pixels in which a first luminance change in a positive direction is detected, and a second count number, which is a count number of pixels in which a second luminance change in a negative direction is detected, are counted in an image output from the light receiving unit at a predetermined frame rate and indicating a luminance change, a coefficient corresponding to a time at which the luminance change is detected is generated, and a multiplication result of the count number of the pixels and the coefficient is integrated.

A detection sensor according to a second aspect of the present technology includes: a light receiving unit in which pixels that perform photoelectric conversion of incident light and generate electric signals are arranged in a lattice pattern; a count unit that counts a first count number, which is a count number of pixels in which a first luminance change in a positive direction is detected, and a second count number, which is a count number of pixels in which a second luminance change in a negative direction is detected, in an image output from the light receiving unit at a predetermined frame rate and indicating a luminance change; a coefficient generation unit that generates a coefficient corresponding to a time at which the luminance change is detected; and an integrating unit that integrates a multiplication result of the count number of the pixels and the coefficient.

In the second aspect of the present technology, an electric signal is generated by performing photoelectric conversion of incident light in a pixel of a light receiving unit, a first count number, which is a count number of pixels in which a first luminance change in a positive direction is detected, and a second count number, which is a count number of pixels in which a second luminance change in a negative direction is detected, are counted in an image output from the light receiving unit at a predetermined frame rate and indicating a luminance change, a coefficient corresponding to a time at which the luminance change is detected is generated, and a multiplication result of the count number of the pixels and the coefficient is integrated.

Note that the signal processing device according to the first aspect of the present technology can be implemented by causing a computer to execute a program. The program to be executed by the computer can be provided by being transmitted via a transmission medium or by being recorded on a recording medium.

The signal processing device and the detection sensor may be independent devices or internal blocks configuring one device.

BRIEF DESCRIPTION OF DRAWINGS

FIG. 20 is a plan view illustrating a configuration example of a light receiving chip.

MODE FOR CARRYING OUT THE INVENTION

Figure 1:
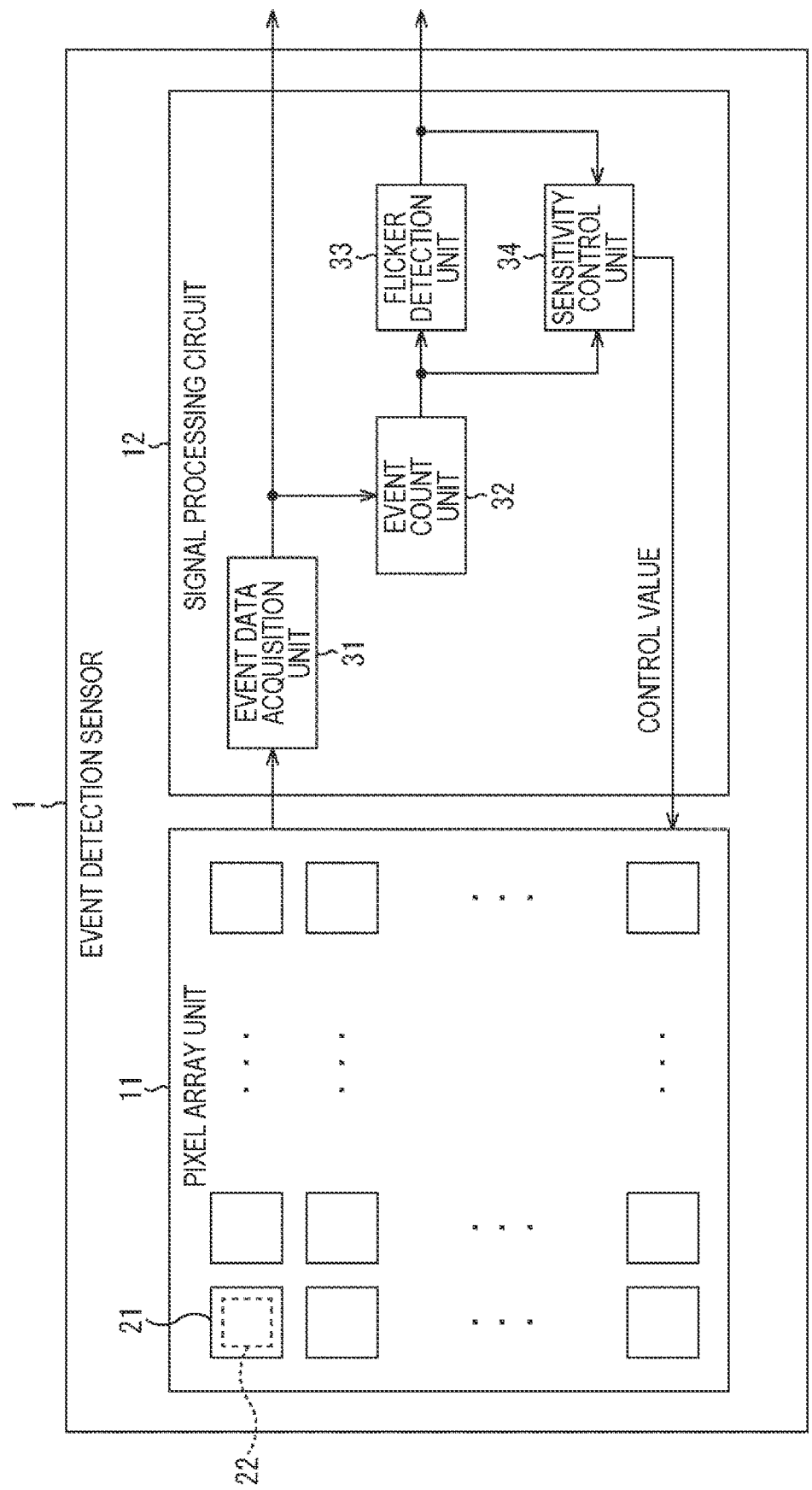
FIG. 1 is a block diagram illustrating a configuration example of an embodiment of an event detection sensor which is a sensor to which the present technology is applied.

Hereinafter, modes (hereinafter, referred to as an embodiments) for carrying out the present technology will be described with reference to the accompanying drawings. Note that in the present specification and the drawings, components having substantially the same functional configuration are designated by the same reference numerals to omit duplicate description. The description will be given in the following order.

1. Configuration example of event detection sensor
2. Principle of event occurrence by light source flicker
3. Configuration example of flicker detection unit
4. Configuration example of sensitivity control unit
5. Processing flow of flicker control process
6. Example of processing result of flicker control process
7. Another configuration example of event detection sensor
8. Configuration example of imaging device
9. Configuration example of electronic device
10. Application example to mobile body 1. Configuration Example of Event Detection Sensor FIG. 1 is a block diagram illustrating a configuration example of an embodiment of an event detection sensor which is a sensor to which the present technology is applied.

An event detection sensor 1 includes a pixel array unit 11 that is a light receiving unit, and a signal processing circuit 12 that processes a signal generated by the light receiving unit.

In the pixel array unit 11, pixels 21 that receive incident light and perform photoelectric conversion are arranged in a lattice pattern. Furthermore, in the pixel array unit 11, a detection circuit 22 that detects a luminance change (light amount change) generated in the pixel 21 as an event corresponds to each pixel 21 and is configured, for example, in a different layer at the same plane position as the pixel 21. Therefore, the detection circuits 22 are also arranged in a lattice pattern.

In the corresponding pixel 21, each detection circuit 22 detects whether there is a luminance change (hereinafter, referred to as "+ change") in a positive direction exceeding a predetermined threshold, a luminance change (hereinafter, referred to as "− change") in a negative direction exceeding a predetermined threshold, or a luminance change exceeding a predetermined threshold within a predetermined period corresponding to the frame rate, and outputs a result as a detection signal.

The pixel array unit 11 sequentially outputs detection signals of the respective detection circuits 22 to the signal processing circuit 12 in a predetermined order under the control of a pixel drive unit (not illustrated).

Therefore, the pixel array unit 11 detects the presence or absence of a luminance change in units of the pixels 21 (in units of the detection circuits 22) at a constant frame rate, and outputs the image data of a change image storing the detection result as the pixel value of each pixel 21 to the signal processing circuit 12 as event data. The pixel value of each pixel of the changed image is a value indicating any of + change, − change, and no change.

Figure 2:
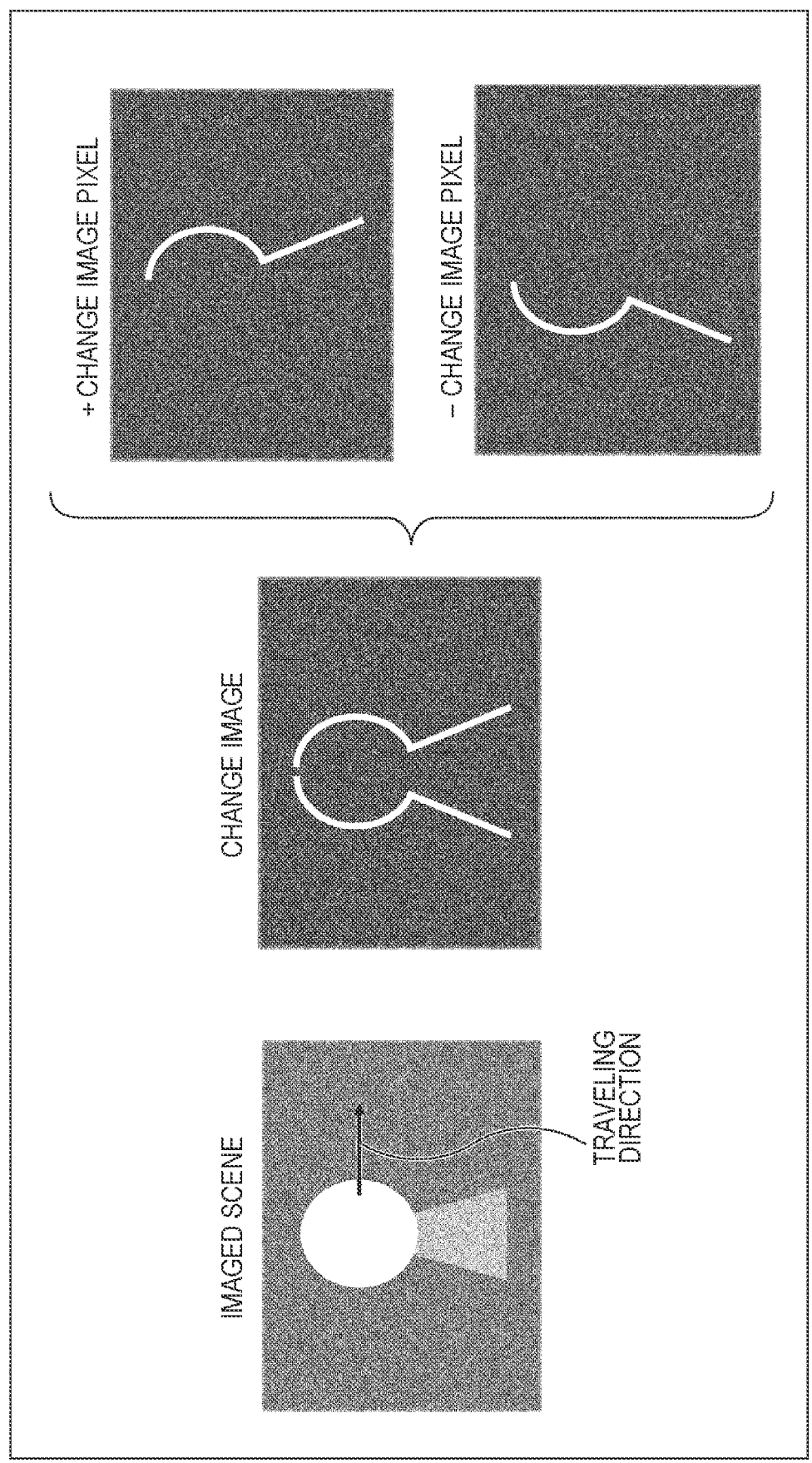
FIG. 2 is a diagram illustrating an example of an image of a change detected by the event detection sensor in FIG. 1.

FIG. 2 illustrates an example of a change image in a case where a certain imaged scene is detected by the event detection sensor 1.

As illustrated on the left side of FIG. 2, it is assumed that the event detection sensor 1 detects a scene in which one person is moving in a direction indicated by an arrow. A person as a subject appears brighter than the surrounding background. In this case, in the pixel of the contour portion on the traveling direction side of the person in the output change image, a luminance change from dark (low luminance) to bright (high luminance) is detected, and thus the pixel value indicating the + change is stored. On the other hand, in the pixel of the contour portion on the opposite side to the traveling direction of the person, a luminance change from bright (high luminance) to dark (low luminance) is detected, and thus the pixel value indicating the − change is stored. The other pixels have the pixel value indicating no change.

In the change image, the pixel value takes ternary values indicating any of + change, − change, or no change, and a high gradation such as 8 bits or 10 bits is not required unlike a normal image sensor, and thus, operations can also be performed in an extremely short time of an exposure time and an AD conversion time. Therefore, it is possible to output the change image at an extremely high frame rate as compared with the frame rate of a normal image sensor such as 30 fps or 60 fps. For example, the change image can be output at a high frame rate such as 1000 fps.

Returning to FIG. 1, the signal processing circuit 12 includes an event data acquisition unit 31, an event count unit 32, a flicker detection unit 33, and a sensitivity control unit 34.

The event data acquisition unit 31 acquires the change image output from the pixel array unit 11 at a predetermined frame rate, outputs the change image to the outside of the sensor, and supplies the change image to the event count unit 32.

The event count unit 32 counts the number of + change pixels (hereinafter, also referred to as a + count number) and the number of − change pixels (hereinafter, also referred to as "− count number") with respect to the change image sequentially supplied from the event data acquisition unit 31, and supplies the counting result to the flicker detection unit 33 and the sensitivity control unit 34.

The flicker detection unit 33 detects (estimates) a flicker amount of a predetermined cycle by using the + count number and the − count number supplied from the event count unit 32, and outputs the flicker amount to the outside of the event detection sensor 1 and the sensitivity control unit 34.

The sensitivity control unit 34 determines, on the basis of the flicker amount supplied from the flicker detection unit 33, whether or not the flicker of the predetermined cycle occurs. In a case where it is determined that the flicker of the predetermined cycle occurs, the sensitivity control unit 34 adjusts (controls) the sensitivity parameter of each detection circuit 22 of the pixel array unit 11 by using the + count number and the − count number supplied from the event count unit 32. For example, the sensitivity control unit 34 performs control such that in a case where the flicker amount is large, the threshold of the luminance change captured as the event is raised so that the occurrence of the event becomes difficult, and in a case where the flicker amount is small, the threshold of the luminance change is lowered so that the occurrence of the event becomes easy. A control value for controlling the threshold of the luminance change is supplied from the sensitivity control unit 34 to each detection circuit 22 of the pixel array unit 11.

2. Principle of Event Occurrence by Light Source Flicker

The principle of an event occurrence by the light source flicker will be described with reference to FIG. 3.

When an event is detected in an environment using a light source having a power supply frequency of 50 Hz, the light source generates flicker at 100 Hz that is twice the power supply frequency of 50 Hz.

Figure 3:
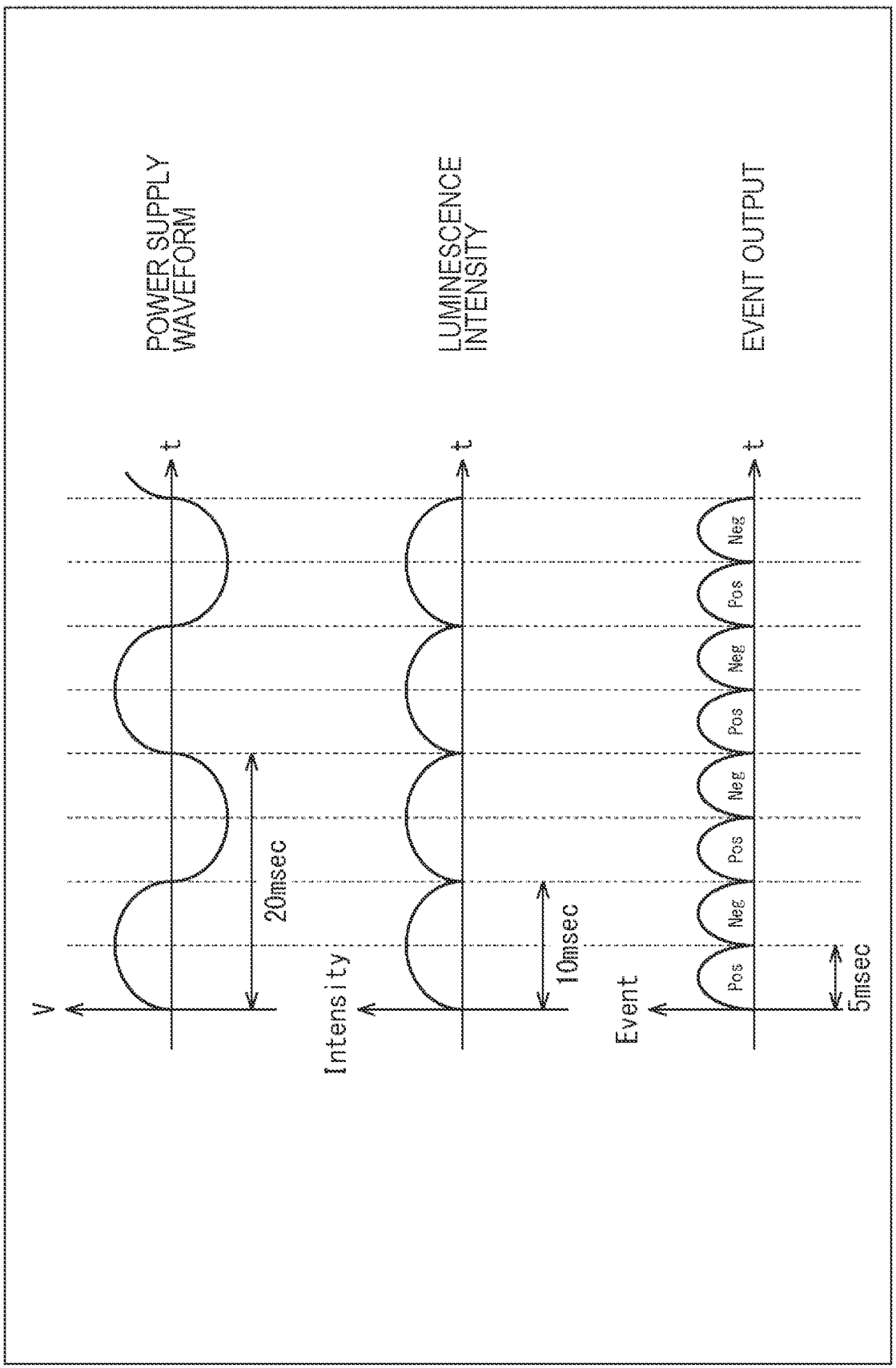
FIG. 3 is a diagram illustrating a principle of an event occurrence by light source flicker.

As illustrated in FIG. 3, one cycle of the light source having a power supply frequency of 50 Hz is 20 msec, and the flicker occurs at a cycle of 10 msec that is ½ of the cycle.

Moreover, when the luminance change is divided into an event of + change (hereinafter, also referred to as a positive event) and an event of − change (hereinafter, also referred to as a negative event), the positive event and the negative event are alternately detected every 5 msec as illustrated in FIG. 3.

Figure 4:
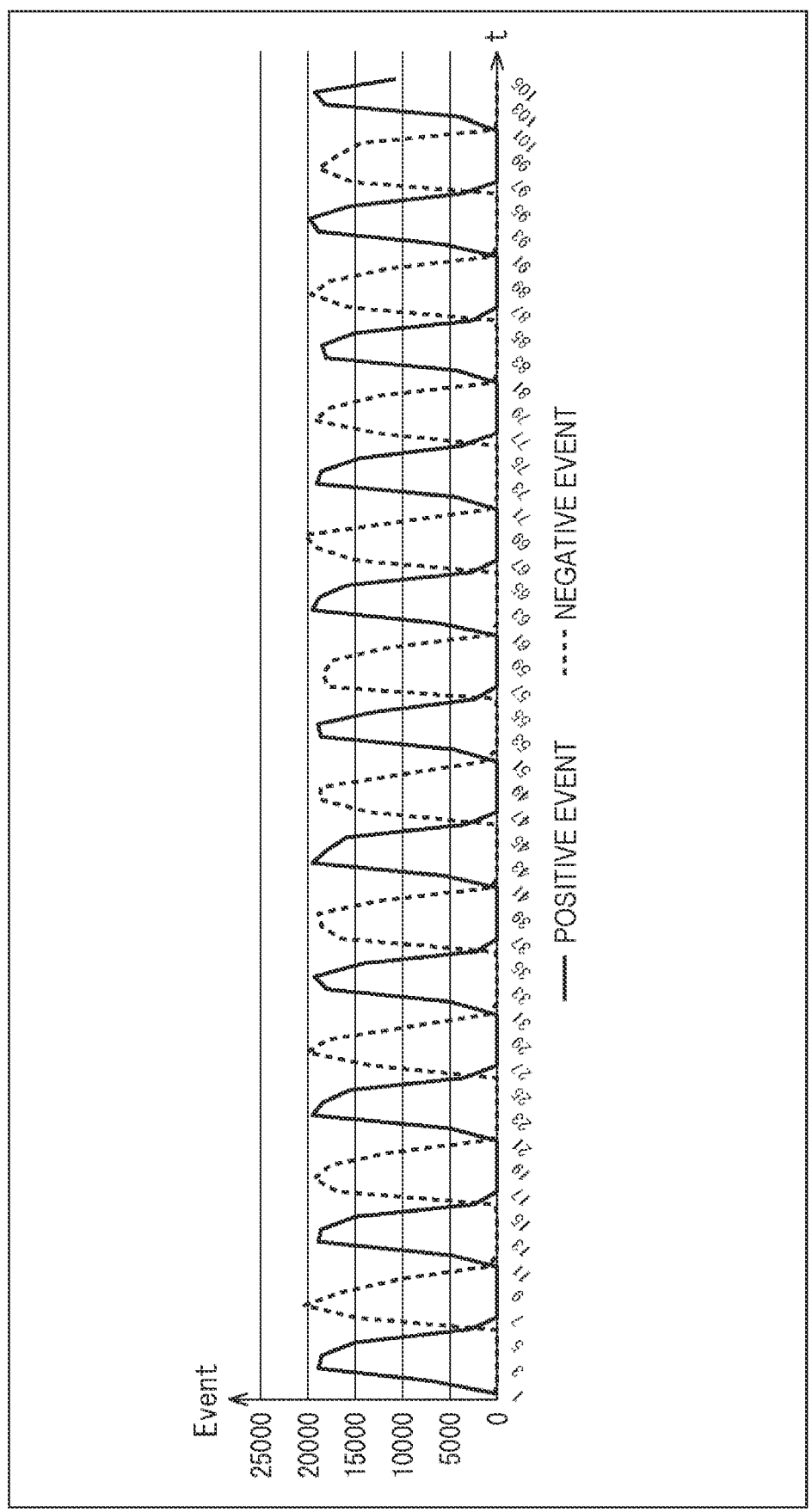
FIG. 4 is a diagram illustrating a result of detecting an event under a light source having a power supply frequency of 50 Hz.

FIG. 4 illustrates a result of actually detecting an event under the light source having a power supply frequency of 50 Hz.

FIG. 4 is a graph in which the frame rate of the event detection sensor 1 is set to 1000 fps, one change image is generated every 1 msec, and the number of each events of positive events and negative events integrated for 10 msec is shown every 1 msec.

When viewing each of the positive events and the negative events, an event with 10 msec as one cycle occurs under the light source having a power supply frequency of 50 Hz.

In this regard, the flicker detection unit 33 of the event detection sensor 1 detects the presence or absence of the flicker of the predetermined cycle by detecting whether the periodicity of change occurs at the predetermined cycle on the basis of the number of events of the positive events and the negative events.

Note that in the following description, a case where the flicker detection unit 33 detects the flicker with 10 msec generated under the light source having a power supply frequency of 50 Hz as one cycle will be described as an example.

The outline of flicker detection by the flicker detection unit 33 and sensitivity parameter control by the sensitivity control unit 34 will be described with reference to FIGS. 5 and 6.

As described with reference to FIG. 4, under the light source having a power supply frequency of 50 Hz, flicker-induced events with 10 msec as one cycle occur in each of the positive events and the negative events.

In this regard, in the case of detecting the flicker occurring under the light source having a power supply frequency of 50 Hz, the flicker detection unit 33 detects the flicker by using the count number of the positive events and the negative events with 10 msec as a detection cycle.

Figure 5:
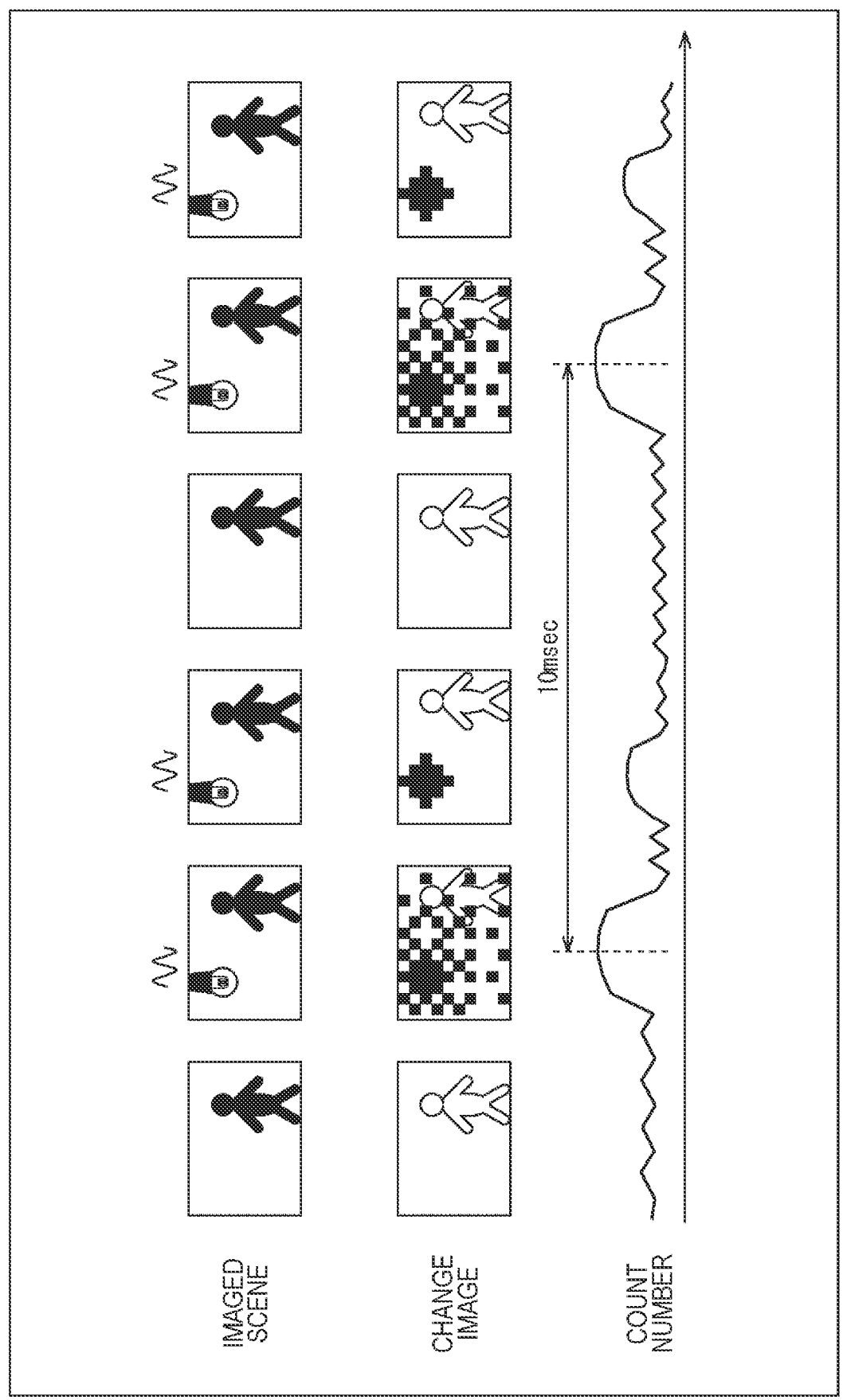
FIG. 5 is a diagram illustrating an outline of flicker detection by a flicker detection unit and sensitivity parameter control by a sensitivity control unit.

FIG. 5 is a schematic image diagram of the flicker occurring under the light source having a power supply frequency of 50 Hz.

As illustrated in FIG. 5, a peak of the count number of the positive event or the negative event occurs at the timing when the flicker occurs.

Figure 6:
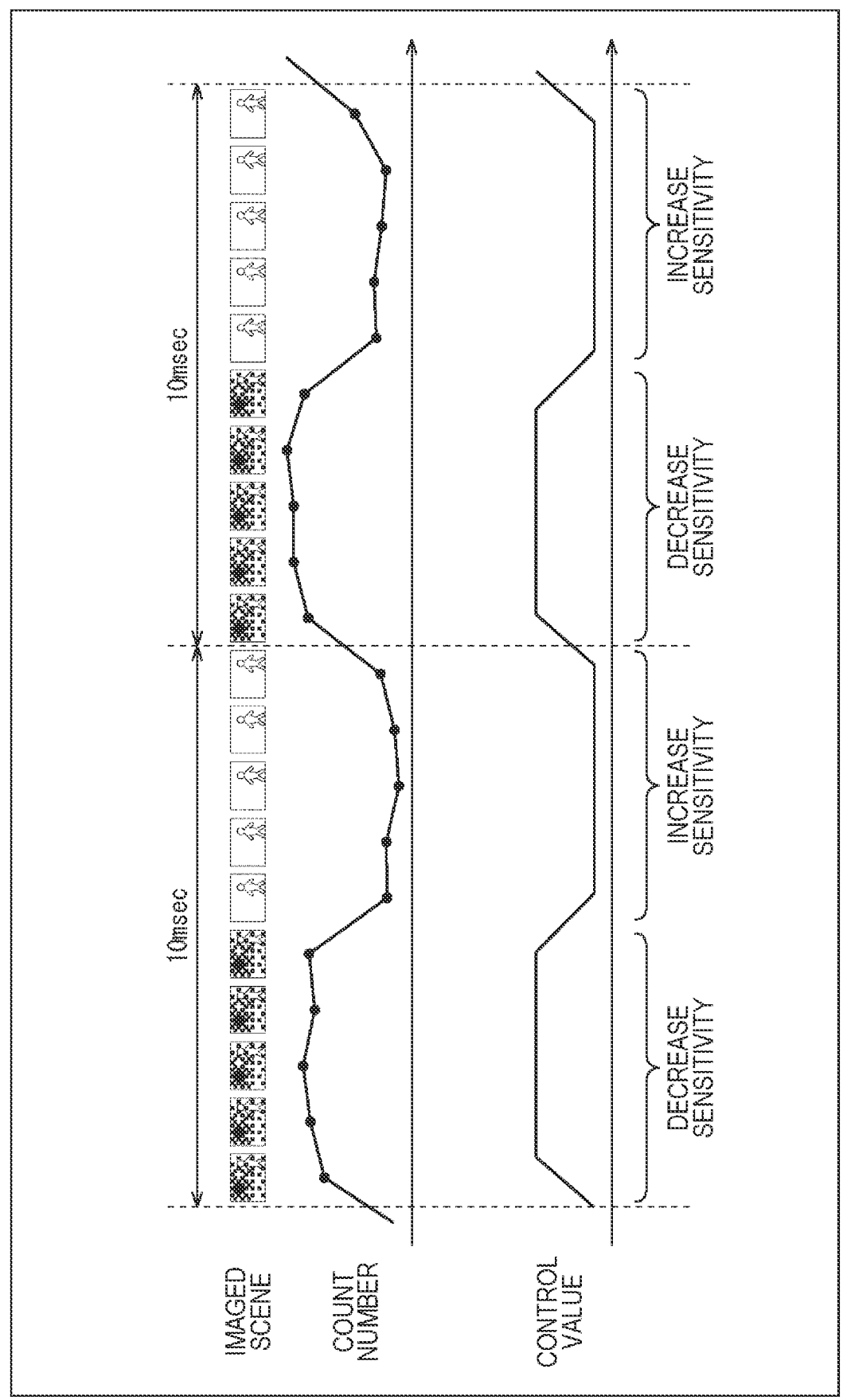
FIG. 6 is a diagram illustrating an outline of the flicker detection by the flicker detection unit and the sensitivity parameter control by the sensitivity control unit.

The appearance image of the flicker in FIG. 5 is more accurately described in units of frames as illustrated in FIG. 6.

In the present embodiment, when the frame rate of the event detection sensor 1 is set to 1000 fps, ten change images are generated in a period of 10 msec which is a detection cycle. Then, among ten frames in one cycle (10 msec), there are a frame in which the flicker of the light source having a power supply frequency of 50 Hz occurs and a frame in which the flicker does not occur.

The sensitivity control unit 34 controls the sensitivity parameter of the detection circuit 22 in units of frames. Specifically, the sensitivity control unit 34 changes the detection sensitivity low only for the frame in which the light source flicker occurs among the ten frames, and keeps the detection sensitivity high (does not change) for the frame in which the light source flicker does not occur.

In other words, the sensitivity control unit 34 controls the sensitivity parameter for every phase generated in the detection cycle. A frame corresponding to a phase, which represents the ordinal number of a frame among the ten frames corresponding to the detection cycle, in the detection cycle is referred to as a frame phase.

Note that instead of 10 msec corresponding to the flicker cycle, the detection cycle may be a cycle of an integral multiple of the flicker cycle.

As illustrated in FIG. 4, the positive event and the negative event occur at different timings, and thus the sensitivity control unit 34 performs sensitivity control on the positive event and the negative event separately. That is, the sensitivity control unit 34 performs control to change the threshold for detecting + change for a frame phase in which a positive event occurs due to light source flicker and to change the threshold for detecting − change for a frame phase in which a negative event occurs due to light source flicker.

3. Configuration Example of Flicker Detection Unit

Figure 7:
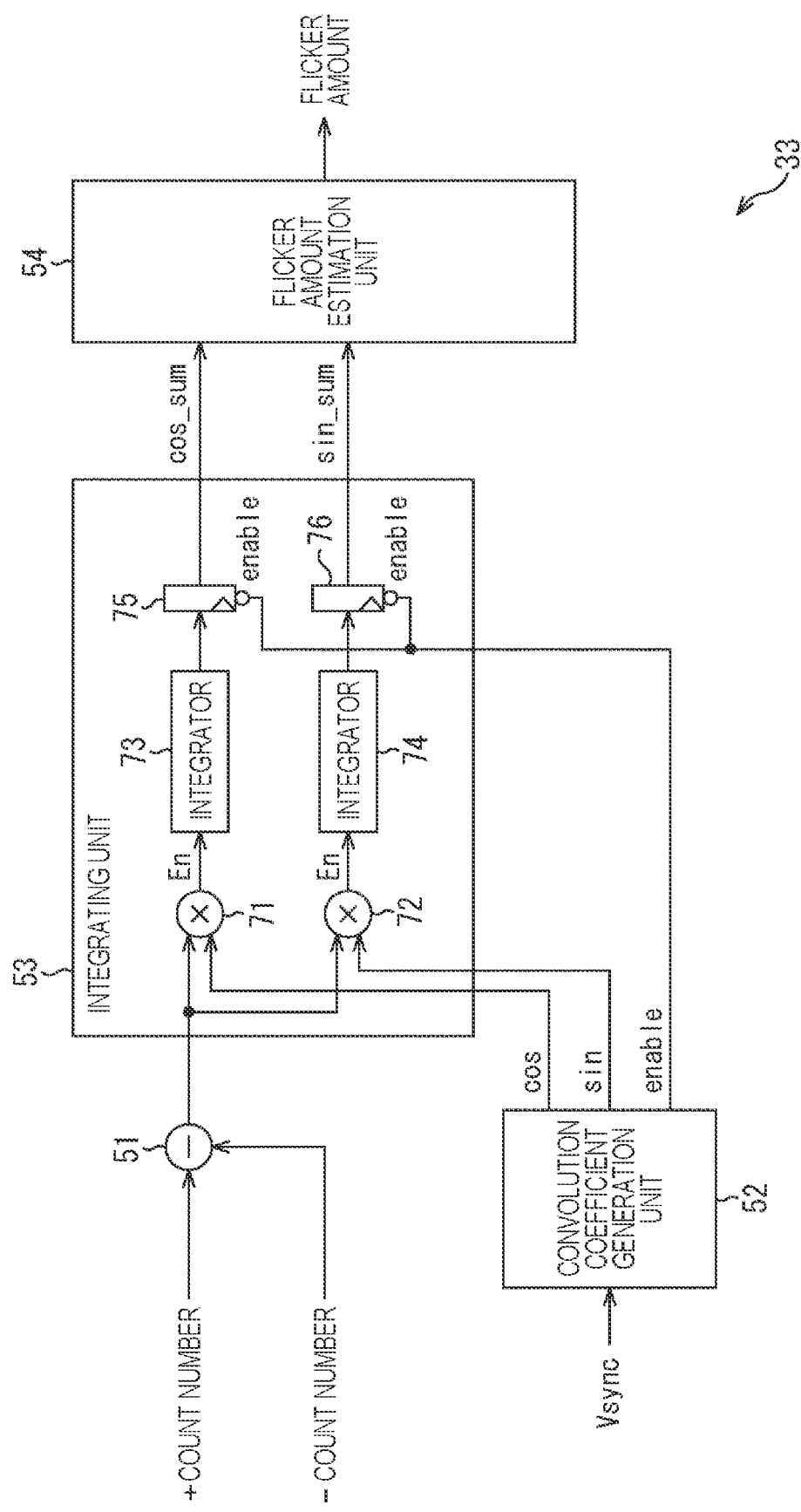
FIG. 7 is a block diagram illustrating a detailed configuration example of the flicker detection unit in FIG. 1.

FIG. 7 is a block diagram illustrating a detailed configuration example of the flicker detection unit 33 in FIG. 1.

The flicker detection unit 33 includes a subtractor 51, a convolution coefficient generation unit 52, an integrating unit 53, and a flicker amount estimation unit 54.

The integrating unit 53 includes multipliers 71 and 72, integrators 73 and 74, and output units 75 and 76.

The + count number and the − count number are supplied from the event count unit 32 to the flicker detection unit 33, and the supplied + count number and − count number are input to the subtractor 51.

The subtractor 51 subtracts the − count number from the + count number, and outputs the subtraction result to the multipliers 71 and 72 of the integrating unit 53.

The convolution coefficient generation unit 52 generates the function value obtained by substituting a value corresponding to the time of the flicker cycle as an argument into the sin function and the cos function of the flicker cycle to be detected, and supplies the function value as a convolution coefficient to the multipliers 71 and 72 of the integrating unit 53.

A vertical drive signal Vsync corresponding to a frame rate at which the pixel array unit 11 outputs the change image is supplied from a timing control unit (not illustrated) to the convolution coefficient generation unit 52, and the convolution coefficient generation unit 52 generates a value corresponding to the time of the flicker cycle on the basis of the vertical drive signal Vsync and substitutes the value into the sin function and the cos function of the flicker period to be detected.

Note that, instead of the sin function and the cos function, an approximation function obtained by approximating the sin function and the cos function may be used, and the approximate value obtained by substituting the value corresponding to the time of the flicker cycle as an argument into the approximation function may be supplied to the multipliers 71 and 72 of the integrating unit 53. In the present embodiment, as described with reference to FIGS. 8 to 10, a function value corresponding to the time of the flicker cycle is calculated by using a sin approximation function and a cos approximation function that approximate the sin function and the cos function to signals that take binary values of 1 and −1. The calculated function value of the sin approximation function is supplied to the multiplier 72, and the calculated function value of the cos approximation function is supplied to the multiplier 71.

Furthermore, the convolution coefficient generation unit 52 generates an enable signal indicating the timing at which the integrating unit 53 outputs the integration result, and supplies the enable signal to the output units 75 and 76 of the integrating unit 53. The integration period of the integrating unit 53 determined at the timing when the enable signal becomes High can be, for example, 10 msec that is the same as the flicker cycle (one cycle) to be detected. Alternatively, the integration period may be a cycle that is an integral multiple of the flicker cycle.

The integrating unit 53 integrates the multiplication result obtained by multiplying the subtraction result which is supplied from the subtractor 51 and obtained by subtracting the − count number from the + count number by the convolution coefficient which is supplied from the convolution coefficient generation unit 52 and uses the sin function and the cos function or the sin approximation function and the cos approximation function obtained by approximating the sin function and the cos function.

The multiplier 71 supplies, to the integrator 73, the multiplication result obtained by multiplying the subtraction result of the count number supplied from the subtractor 51 by the function value of the cos approximation function supplied from the convolution coefficient generation unit 52.

The multiplier 72 supplies, to the integrator 74, the multiplication result obtained by multiplying the subtraction result of the count number supplied from the subtractor 51 by the function value of the sin approximation function supplied from the convolution coefficient generation unit 52.

The integrator 73 integrates the multiplication result supplied from the multiplier 71 and supplies the result to the output unit 75. The integrator 74 integrates the multiplication result supplied from the multiplier 72 and supplies the result to the output unit 76.

The output unit 75 includes, for example, a flip-flop, acquires an integral value cos_sum of the integrator 73 at the timing when the enable signal supplied from the convolution coefficient generation unit 52 is High, and supplies the integral value cos_sum to the flicker amount estimation unit 54.

The output unit 76 includes, for example, a flip-flop, acquires an integral value sin_sum of the integrator 74 at the timing when the enable signal supplied from the convolution coefficient generation unit 52 is High, and supplies the integral value sin_sum to the flicker amount estimation unit 54.

The flicker amount estimation unit 54 calculates the amplitude component of the flicker frequency by using the integration result supplied from each of the output units 75 and 76, and estimates the flicker amount (flicker likelihood) occurring at a specific frequency (flicker frequency).

Specifically, the flicker amount estimation unit 54 calculates a flicker amount EST_FL by Formula (1) or Formula (2) using a frame integration number sum, the integral values cos_sum and sin_sum.

[Mathematical formula 1]

$$EST\_FL = (|sin\_sum| + |cos\_sum|)/sum \quad (1)$$

$$EST\_FL = \sqrt{(|sin\_sum|^2 + |cos\_sum|^2)}/sum \quad (2)$$

Here, the frame integration number sum is equal to the number of frames integrated by the integrating unit 53, and in the present embodiment, the integration period is 10 msec which is the same as the flicker cycle, and thus sum=10.

In Formulas (1) and (2), the flicker amount EST_FL is a small value in a case where the flicker of the target cycle does not occur, and the flicker amount EST_FL is a large value when the flicker of the target cycle occurs.

Figure 8:
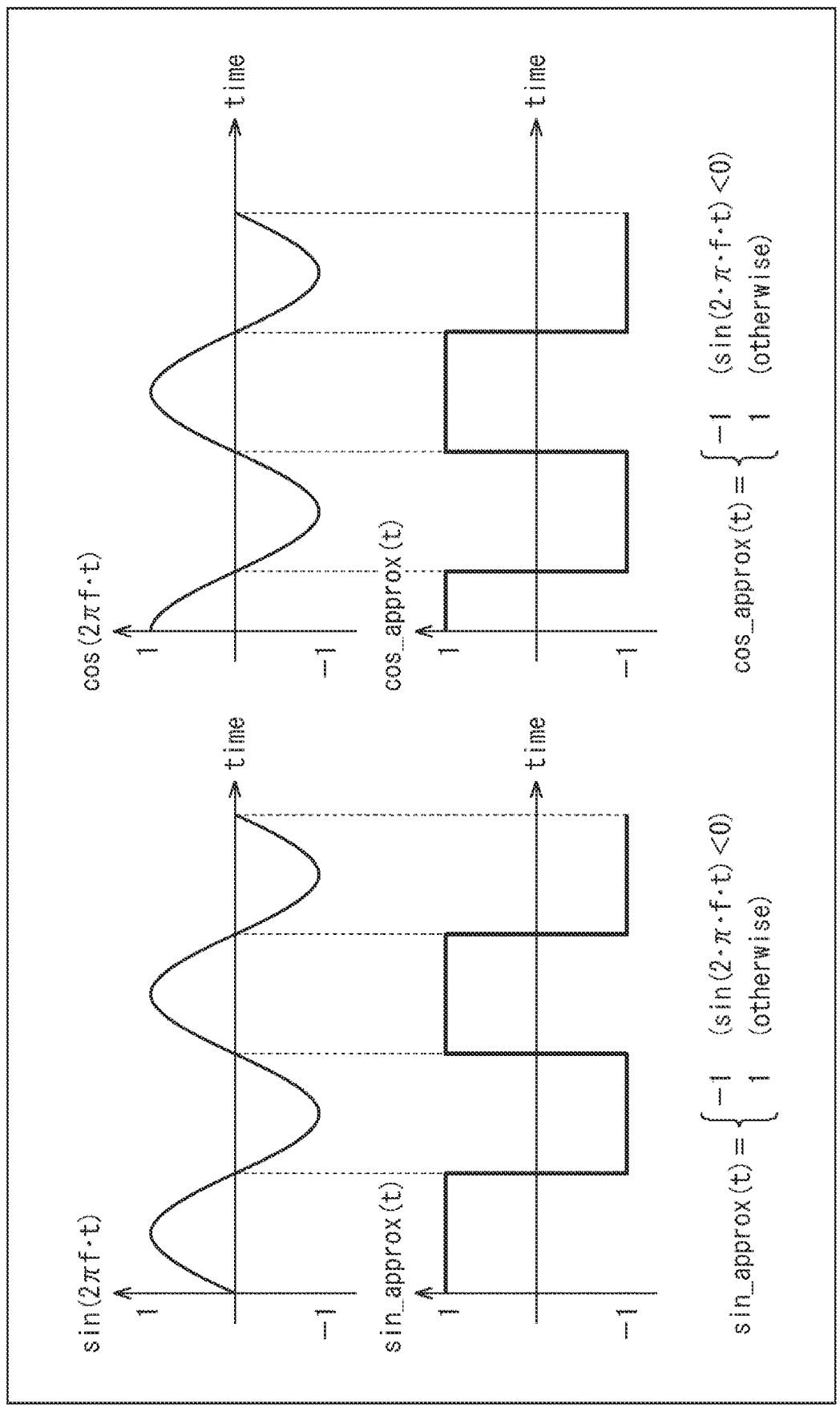
FIG. 8 is a block diagram illustrating an example of a sin function and a cos function or a sin approximation function and a cos approximation function generated by a convolution coefficient generation unit.

FIG. 8 illustrates an example of the sin function and the cos function generated by the convolution coefficient generation unit 52, or the sin approximation function and the cos approximation function obtained by approximating the sin function and the cos function.

As illustrated in the upper part of FIG. 8, the convolution coefficient generation unit 52 may generate the function value obtained by substituting the value corresponding to the time of the flicker cycle into the sin function and the cos function having the flicker cycle to be detected as one cycle. However, in the present embodiment, as illustrated in the lower part of FIG. 8, the function value corresponding to the time of the flicker cycle is calculated by using the sin approximation function and the cos approximation function approximating the sin function and the cos function to signals having binary values of 1 and −1.

When the sin approximation function and the cos approximation function are expressed by sin_approx(t) and cos_approx(t), the sin approximation function and the cos approximation function can be expressed by the following formula.

[Mathematical formula 2]

$$sin\_approx(t) = \begin{cases} -1 & (sin(2 \cdot \pi \cdot f \cdot t) < 0) \\ 1 & (otherwise) \end{cases} \quad (3)$$

$$cos\_approx(t) = \begin{cases} -1 & (cos(2 \cdot \pi \cdot f \cdot t) < 0) \\ 1 & (otherwise) \end{cases} \quad (4)$$

In Formulas (3) and (4), f represents the flicker cycle, and t represents the value corresponding to the time of the flicker cycle. With this approximation, as illustrated in FIG. 8, the sin approximation function and the cos approximation function are approximated to a signal that outputs +1 when the sin function and the cos function are positive and outputs −1 when the sin function and the cos function are negative. Since the present flicker cycle is 10 msec, the outputs of the sin approximation function and the cos approximation function switch between +1 and −1 in units of 5 msec.

As such a sin approximation function and a cos approximation function, for example, a configuration can be adopted in which a table in which +1 or −1 is associated with each time of one cycle in the convolution coefficient generation unit 52 is stored, and the function values of the sin approximation function and the cos approximation function are output on the basis of the table.

Figure 9:
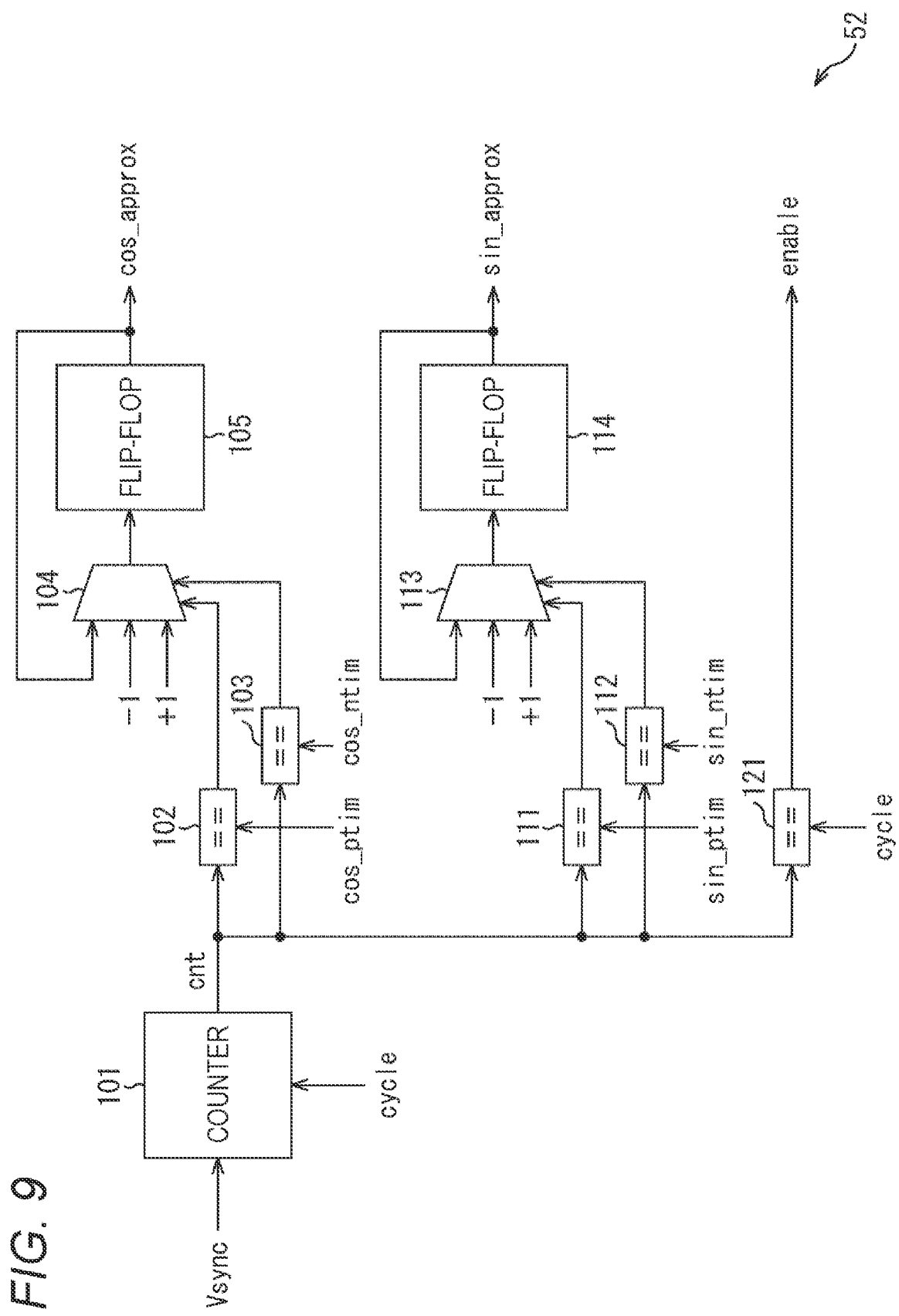
FIG. 9 is a diagram illustrating a circuit configuration example of the convolution coefficient generation unit in a case where the sin approximation function and the cos approximation function illustrated in FIG. 8 are adopted.

In addition, the sin approximation function and the cos approximation function can be realized by a logic circuit as illustrated in FIG. 9.

FIG. 9 illustrates a circuit configuration example of the convolution coefficient generation unit 52 in a case where the sin approximation function and the cos approximation function illustrated in FIG. 8 are adopted.

The convolution coefficient generation unit 52 in FIG. 9 includes a counter 101 that performs counting corresponding to the flicker cycle.

Furthermore, the convolution coefficient generation unit 52 includes comparators 102 and 103, a selector 104, and a flip-flop 105 as a configuration for outputting the function value cos_approx of the cos approximation function corresponding to the time of the flicker cycle.

Moreover, the convolution coefficient generation unit 52 includes comparators 111 and 112, a selector 113, and a flip-flop 114 as a configuration for outputting the function value sin_approx of the sin approximation function corresponding to the time of the flicker cycle.

Moreover, the convolution coefficient generation unit 52 includes a comparator 121 as a configuration for outputting an enable signal.

The vertical drive signal Vsync and a count number cycle corresponding to the flicker cycle are input to the counter 101. The counter 101 starts a count value cnt from 0 and counts up according to the vertical drive signal Vsync. Then, when counting the count value cnt up to the count number cycle, the counter 101 resets the count value cnt and repeats the process of counting from 0 again. Since the present flicker cycle is 10 msec, and the vertical drive signal Vsync is a signal which corresponds to the frame rate of 1000 fps and becomes High at intervals of 1 msec, "10" is input as the count number cycle.

The count value cnt of the counter 101 is supplied to the comparators 102, 103, 111, 112, and 121.

A set value cos_ptim is supplied to the comparator 102, and the comparator 102 compares the count value cnt supplied from the counter 101 with the set value cos_ptim, and outputs +1 to the selector 104 at a timing when the count value cnt matches the set value cos_ptim. For the count value cnt other than the setting value cos_ptim, for example, 0 is output.

A set value cos_ntim is supplied to the comparator 103, and the comparator 103 compares the count value cnt supplied from the counter 101 with the set value cos_ntim, and outputs −1 to the selector 104 at a timing when the count value cnt matches the set value cos_ntim. For the count value cnt other than the set value cos_ntim, for example, 0 is output.

The selector 104 selects +1 and outputs +1 to the flip-flop 105 at a timing when +1 is supplied from the comparator 102, selects −1 and outputs −1 to the flip-flop 105 at a timing when −1 is supplied from the comparator 102, and outputs a value fed back from the flip-flop 105 to the flip-flop 105 at other timings.

The flip-flop 105 holds and outputs the value (+1 or −1) input from the selector 104 until the value is updated next time. The value output from the flip-flop 105 is the function value cos_approx of the cos approximation function.

A set value sin_ptim is supplied to the comparator 111, and the comparator 111 compares the count value cnt supplied from the counter 101 with the set value sin_ptim, and outputs +1 to the selector 113 at a timing the count value cnt matches the set value sin_ptim. For the count value cnt other than the setting value sin_ptim, for example, 0 is output.

A set value sin_ntim is supplied to the comparator 112, and the comparator 112 compares the count value cnt supplied from the counter 101 with the set value sin_ntim, and outputs −1 to the selector 113 at a timing when the count value cnt matches the set value sin_ntim. For the count value cnt other than the setting value sin_ntim, for example, 0 is output.

The selector 113 selects +1 and outputs +1 to the flip-flop 114 at a timing when +1 is supplied from the comparator 111, selects −1 and outputs −1 to the flip-flop 114 at a timing when −1 is supplied from the comparator 112, and outputs a value fed back from the flip-flop 114 to the flip-flop 114 at other timings.

The flip-flop 114 holds and outputs the value (+1 or −1) input from the selector 113 until the value is updated next time. The value output from the flip-flop 114 is the function value sin_approx of the sin approximation function.

The count number cycle is supplied to the comparator 121, and the comparator 121 compares the count value cnt supplied from the counter 101 with the count number cycle and sets the enable signal to High at a timing when the count value cnt matches the count number cycle. For the count value cnt other than the count number cycle, an enable signal of Low is output. Since the count value cnt supplied from the counter 101 is a repetition of 1, 2, 3, . . . , 10, when the count value cnt is 10, an enable signal of High is output.

Figure 10:
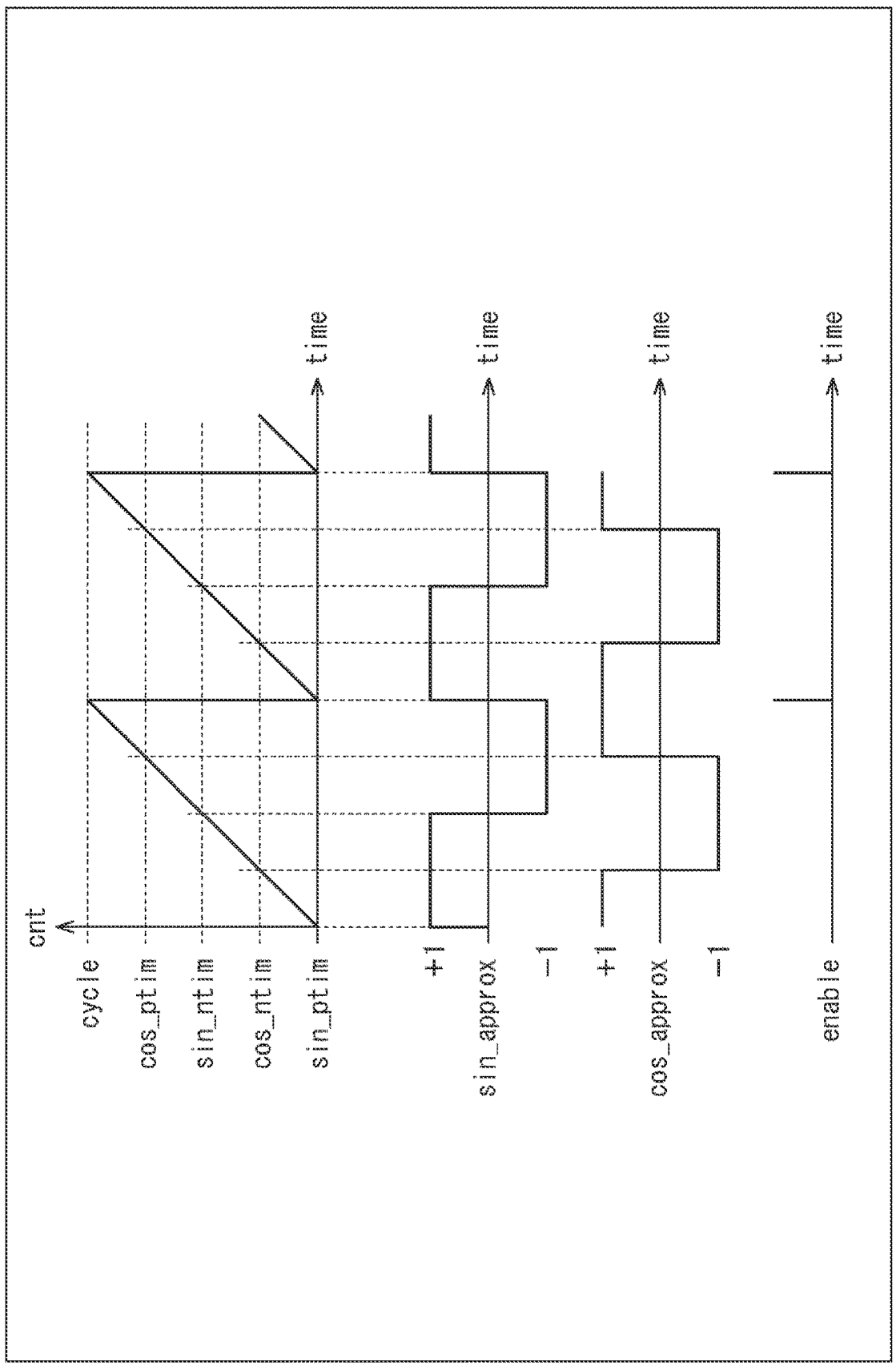
FIG. 10 is a timing chart in a case where an operation is performed by the logic circuit illustrated in FIG. 9.

FIG. 10 illustrates a timing chart in a case where the logic circuit illustrated in FIG. 9 is operated.

The sin approximation function sin_approx(t) and the cos approximation function cos_approx(t) illustrated in FIG. 8 are realized by the logic circuit of FIG. 9.

The enable signal is High in a frame cycle, specifically, in units of 10 msec in a case where flicker occurring under the light source having a power supply frequency of 50 Hz is detected.

4. Configuration Example of Sensitivity Control Unit

Next, the control of the sensitivity parameter by the sensitivity control unit 34 in FIG. 1 will be described.

The + count number and the − count number are supplied from the event count unit 32 to the sensitivity control unit 34, and the detection result of the flicker amount is supplied from the flicker detection unit 33.

In a case where the detected flicker amount is large (larger than a predetermined flicker determination threshold FL_TH), the sensitivity control unit 34 performs control to decrease the detection sensitivity by changing the control value for controlling the threshold of the luminance change as the sensitivity parameter. In the present embodiment, the sensitivity control unit 34 directly changes, as the control value, the threshold itself of the luminance change, and separately controls a + side threshold Vrefp for controlling the detection sensitivity of + change and a − side threshold Vrefn for controlling the detection sensitivity of − change.

Since the flicker amount for each detection cycle is supplied with 10 msec as the detection cycle from the flicker detection unit 33, the sensitivity control unit 34 determines the + side threshold Vrefp and the − side threshold Vrefn, which are control values for the next detection cycle, for every frame phase on the basis of the event count number for each frame phase of the detection cycle.

Figure 11:
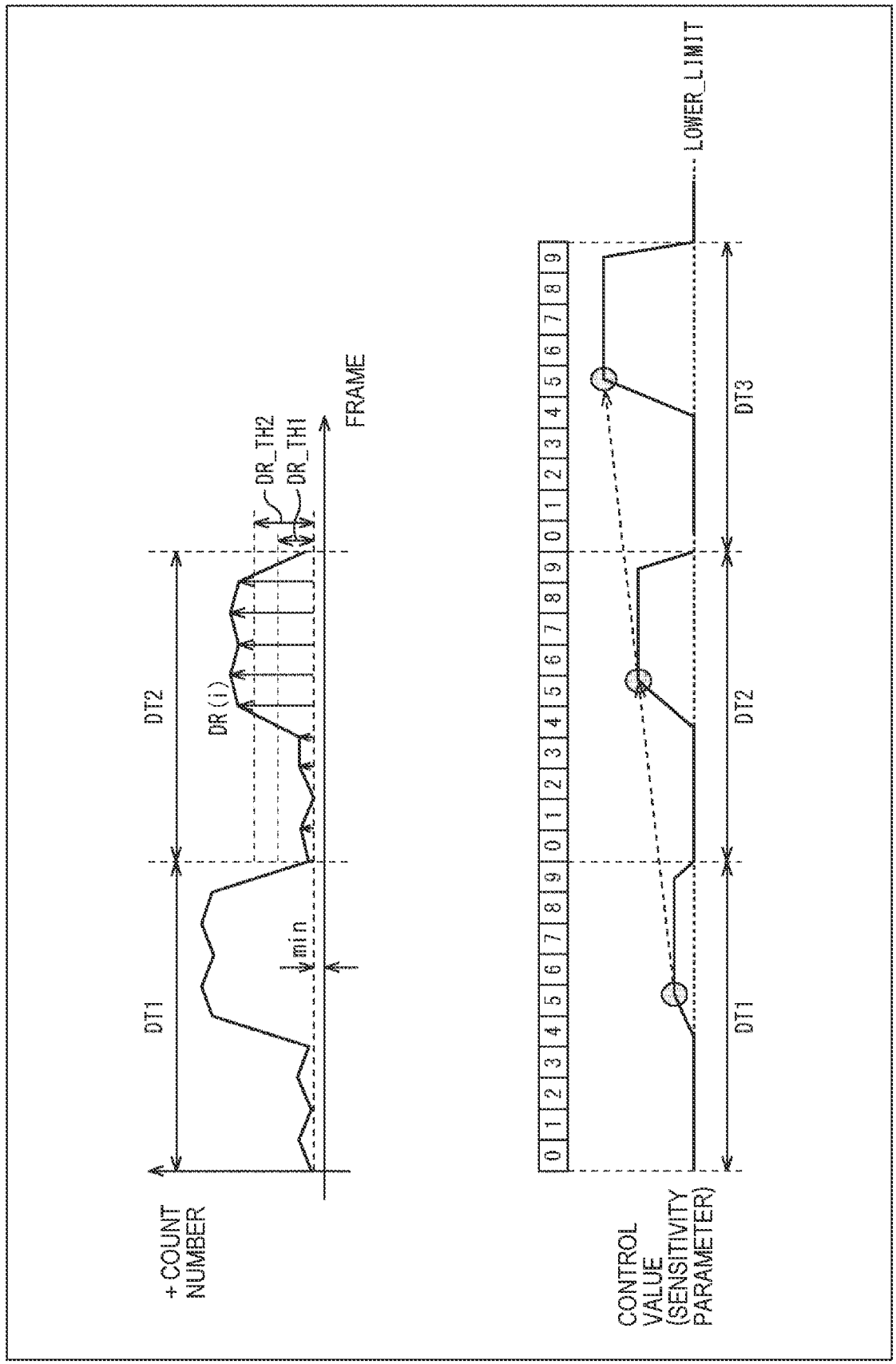
FIG. 11 is a diagram illustrating a method of determining a + side threshold for controlling the detection sensitivity of a + change.
Figure 12:
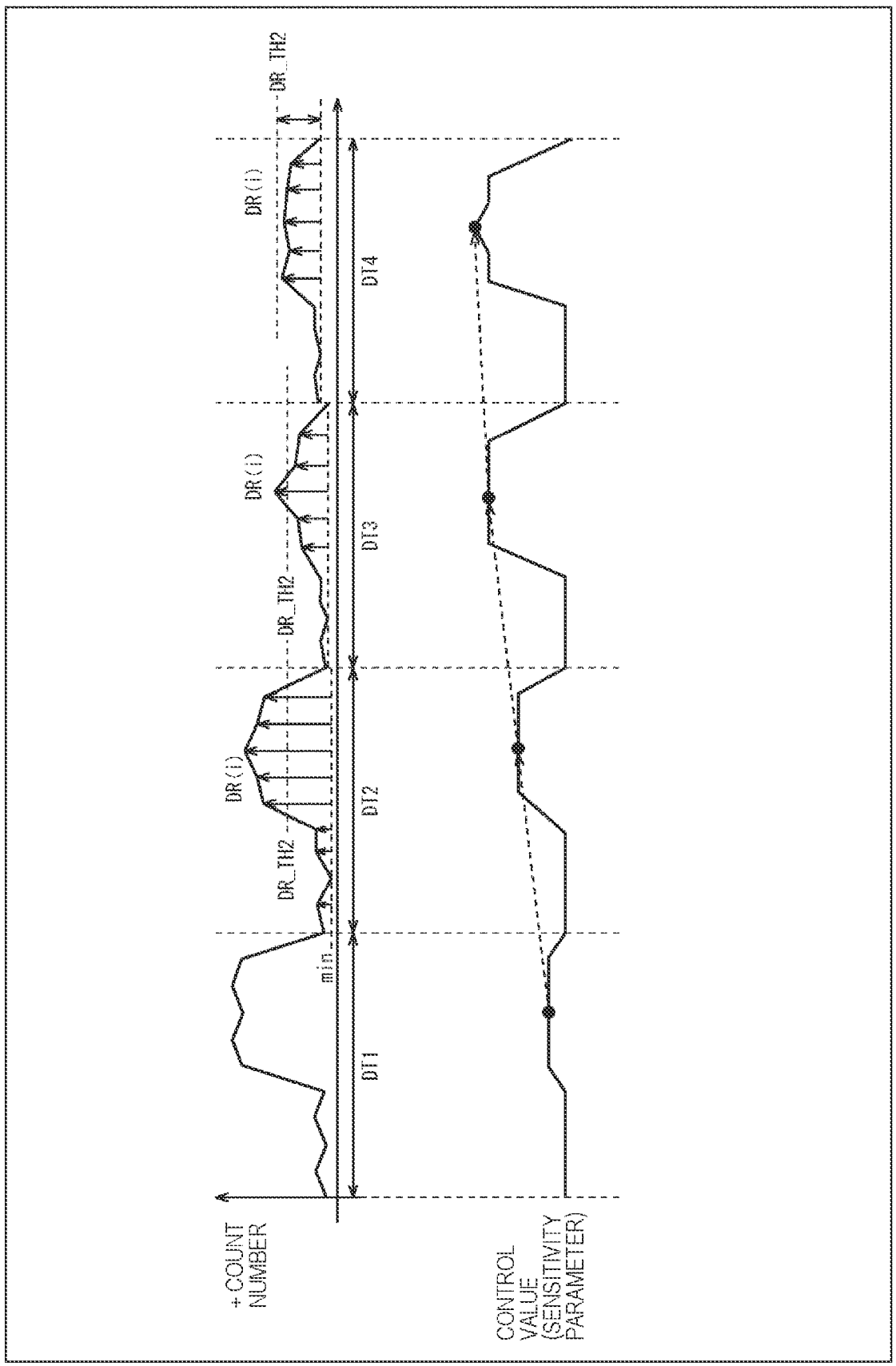
FIG. 12 is a diagram illustrating the method of determining the + side threshold for controlling the detection sensitivity of the + change.

With reference to FIGS. 11 and 12, a method of determining the + side threshold Vrefp for controlling the detection sensitivity of + change will be described.

In FIGS. 11 and 12, the flicker amount EST_FL of a detection cycle DT2 is supplied from the flicker detection unit 33 at a predetermined timing, and a + count number P_count(i) of each frame phase i (i is an integer from 0 to 9) of the detection cycle DT2 is sequentially supplied from the event count unit 32. The sensitivity control unit 34 determines a control value sense(i) of each frame phase i of a next detection cycle DT3, that is, a + side threshold Vrefp (i) on the basis of the + count number P_count(i) of each frame phase i of the detection cycle DT2.

First, the sensitivity control unit 34 calculates a minimum value min(DT2) of the + count number P_count(i) of the frame phase i of the detection cycle DT2 by Formula (5). MIN ( ) in Formula (5) represents a function for calculating the minimum value (i is an integer from 0 to 9).

$$\mathrm{min}(DT2)=\mathrm{MIN}(P\_\mathrm{count}(i)) \quad (5)$$

Next, the sensitivity control unit 34 calculates a dynamic range DR(i) of each frame phase i of the detection cycle DT2 by subtracting the minimum value min (DT2) from the + count number P_count(i) of each frame phase i of the detection cycle DT2 as in Formula (6).

$$DR(i)=P\_\mathrm{count}(i)-\mathrm{min}(DT2) \quad (6)$$

Then, in a case where the calculated dynamic range DR(i) of each frame phase i is smaller than a preset first threshold DR_TH1, the sensitivity control unit 34 changes the control value sense(i) of the frame phase i of the next detection cycle DT3 to increase the detection sensitivity. In the case of increasing the detection sensitivity, the sensitivity control unit 34 changes the control value sense(i), which is the + side threshold Vrefp(i), in a direction of decreasing the control value sense(i). Specifically, the sensitivity control unit 34 calculates a control value sense'(i) of the frame phase i of the next detection cycle DT3 by following Formula (7).

$$\mathrm{sense}'(i)=\mathrm{MAX}(\mathrm{sense}(i)-\mathrm{VALUE},\mathrm{LOWER\_LIMIT}) \quad (7)$$

In Formula (7), MAX ( ) is a function for selecting a maximum value, VALUE represents a change width of the detection sensitivity, and LOWER_LIMIT represents a limit value in the case of increasing the detection sensitivity. According to Formula (7), in a case where a value {sense (i)−VALUE} obtained by subtracting a change width VALUE from the control value sense(i) of the detection cycle DT2 is equal to or larger than a limit value LOWER_LIMIT, the sensitivity control unit 34 determines the subtraction value as a control value sense'(i) of the frame phase i of the next detection cycle DT3, and in a case where the a value {sense(i) −VALUE} is smaller than the limit value LOWER_LIMIT, the sensitivity control unit determines the limit value LOWER_LIMIT as the control value sense'(i) of the frame phase i of the next detection cycle DT3.

On the other hand, in a case where the calculated dynamic range DR(i) is larger than a preset second threshold DR_TH2, the sensitivity control unit 34 changes the control value sense(i) of the frame phase i of the next detection cycle DT3 to decrease the detection sensitivity. In the case of decreasing the detection sensitivity, the sensitivity control unit 34 changes the control value sense(i), which is the + side threshold Vrefp(i), in a direction of increasing the control value sense(i). Specifically, the sensitivity control unit 34 calculates the control value sense'(i) of the frame phase i of the next detection cycle DT3 by following Formula (8).

$$\mathrm{sense}'(i)=\mathrm{MIN}(\mathrm{sense}(i)+\mathrm{VALUE},\mathrm{UPPER\_LIMIT}) \quad (8)$$

In Formula (8), MIN ( ) is a function that selects a minimum value, VALUE represents a change width of the detection sensitivity, and UPPER_LIMIT represents a limit value in the case of decreasing the detection sensitivity. According to Formula (8), in a case where a value {sense (i)+VALUE} obtained by adding the change width VALUE to the control value sense(i) of the detection cycle DT2 is equal to or less than a limit value UPPER_LIMIT, the sensitivity control unit 34 determines the added value as the control value sense'(i) of the frame phase i of the next detection cycle DT3, and in a case where the value {sense (i)+VALUE} is larger than the limit value UPPER_LIMIT, the sensitivity control unit 34 determines the limit value UPPER_LIMIT as the control value sense'(i) of the frame phase i of the next detection cycle DT3.

Note that in this example, the change width VALUE in the addition direction for increasing the detection sensitivity and the change width VALUE in the subtraction direction for decreasing the detection sensitivity have the same value, but may have different values.

In a case where the calculated dynamic range DR(i) of each frame phase i is equal to or greater than the first threshold DR_TH1 and equal to or less than the second threshold DR_TH2, the control value sense(i) of the frame phase i is not changed and the current control value sense(i) is maintained.

In the example of FIG. 11, the respective dynamic ranges DR(5) to DR(9) of the fifth frame phase to the ninth frame phase of the detection cycle DT2 are larger than the second threshold DR_TH2, and thus the control values sense' (5) to sense' (9) of the fifth frame phase to the ninth frame phase of the next detection cycle DT3 are changed in a direction of decreasing the detection sensitivity. In other words, the control values sense' (5) to sense' (9) of the detection cycle DT3 are changed to be higher by the change width VALUE than the control values sense(5) to sense(9) of the detection cycle DT2.

On the other hand, the respective dynamic ranges DR(0) to DR(4) from the 0-th frame phase to the fourth frame phase of the detection cycle DT2 are smaller than the first threshold DR_TH1, but reach the limit value LOWER_LIMIT in the case of increasing the detection sensitivity, and thus, the control values sense' (0) to sense' (4) from the 0-th frame phase to the fourth frame phase of the next detection cycle DT3 are not changed.

FIG. 12 illustrates a setting example of the control value sense(i) corresponding to the + count number P_count(i) of each frame phase i of four consecutive detection cycles DT1 to DT4.

The respective dynamic ranges DR(5) to DR(9) of the fifth frame phase to the ninth frame phase of the detection cycle DT2 are larger than the second threshold DR_TH2, and thus the control values sense(5) to sense(9) of the fifth frame phase to the ninth frame phase of the next detection cycle DT3 are changed in a direction of decreasing the detection sensitivity. In other words, the control values sense(5) to sense(9) of the detection cycle DT3 are changed in a direction to be higher by the change width VALUE than the control values sense(5) to sense(9) of the detection cycle DT2.

In the next detection cycle DT3, only the dynamic range DR(7) of the seventh frame phase is larger than the second threshold DR_TH2, and thus, in the next detection cycle DT4, only the control value sense(7) of the seventh frame phase is changed in a direction of decreasing the detection sensitivity. In other words, the control value sense(7) of the detection cycle DT4 is changed to a direction to be higher than the control value sense(7) of the detection cycle DT3, and the control values sense(5) and sense(6) of the fifth and sixth frame phases and the control values sense(8) and sense(8) of the eighth and ninth frame phases remain the same as the control value of the detection cycle DT3.

Although the control value sense(i) of each frame phase i for controlling the detection sensitivity of + change has been described, the sensitivity control unit 34 also performs similar control for the control value sense(i) of each frame phase i for controlling the detection sensitivity of − change.

Figure 13:
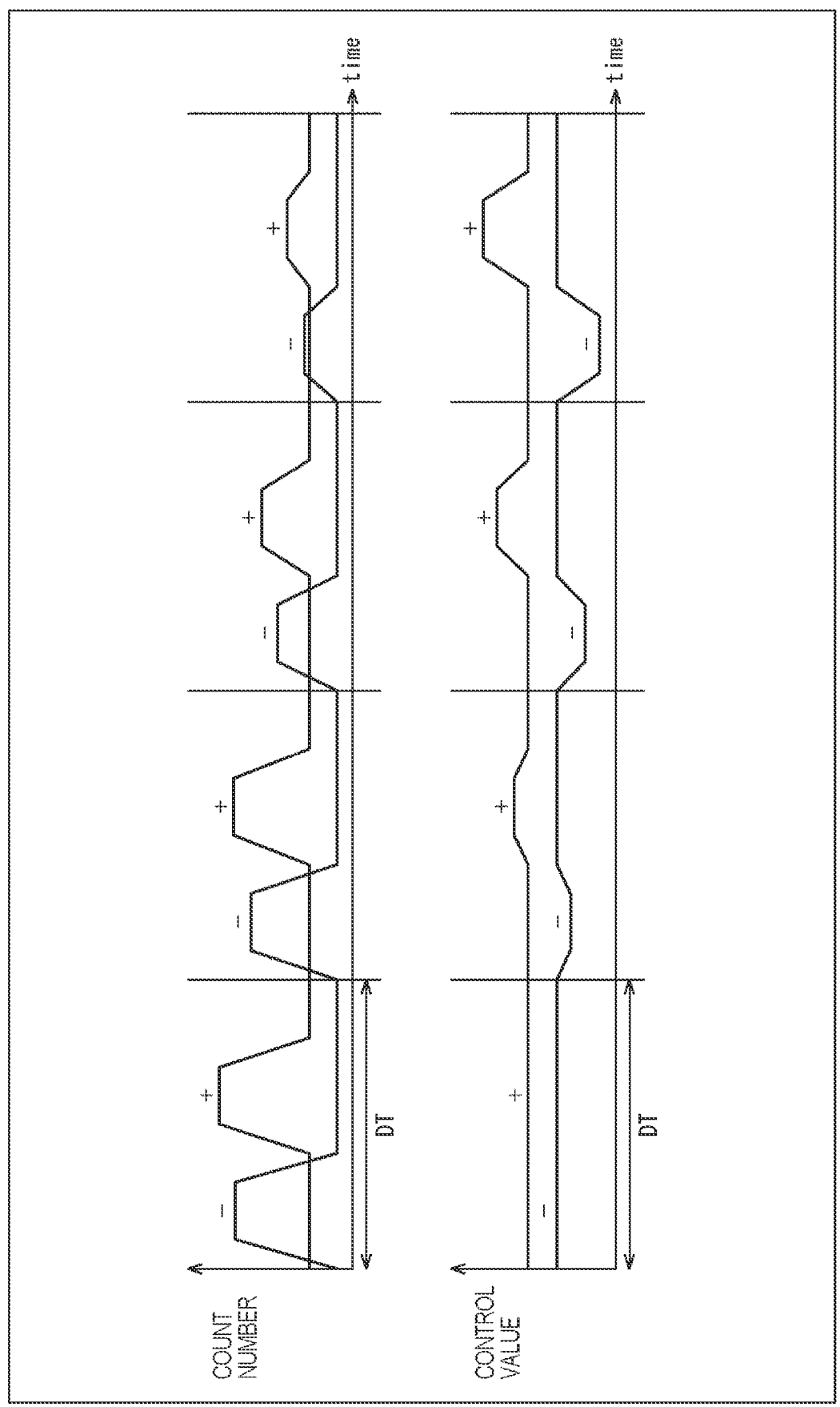
FIG. 13 is an image diagram of the input and output of the sensitivity control unit.

FIG. 13 is a diagram illustrating the image of the control value sense(i), which is the output of the sensitivity control unit 34, with respect to the count number of the event count unit 32, which is the input of the sensitivity control unit 34 for each of the control of the detection sensitivity of + change and the control of the detection sensitivity of − change.

Since polarities are opposite between the control of the detection sensitivity of + change and the control of the detection sensitivity of − change, in the control of the change detection sensitivity, the sensitivity control unit 34 changes the control value sense(i), which is the − side threshold Vrefn, to a direction of decreasing the detection sensitivity in the case of decreasing the detection sensitivity, and changes the control value sense(i), which is the − side threshold Vrefn, in a direction of increasing the detection sensitivity in the case of increasing the detection sensitivity. Note that the magnitude relationship of the control value sense(i) also changes depending on the structure of the pixels of the light receiving unit and the polarity at the time of detection, and thus can be appropriately determined according to the conditions.

In the control of the detection sensitivity of − change, the change width VALUE in the case of increasing and decreasing the detection sensitivity may be the same value similarly to the control of the detection sensitivity of + change or may be different values. Furthermore, the change width VALUE of the detection sensitivity may be the same value or may be different values between the control of the detection sensitivity of + change and the control of the detection sensitivity of − change.

Hereinafter, the control value sense(i) of the detection sensitivity of + change is referred to as a control value p_sense(i), and the control value sense(i) of the detection sensitivity of − change is referred to as a control value n_sense(i) for distinction.

Figure 14:
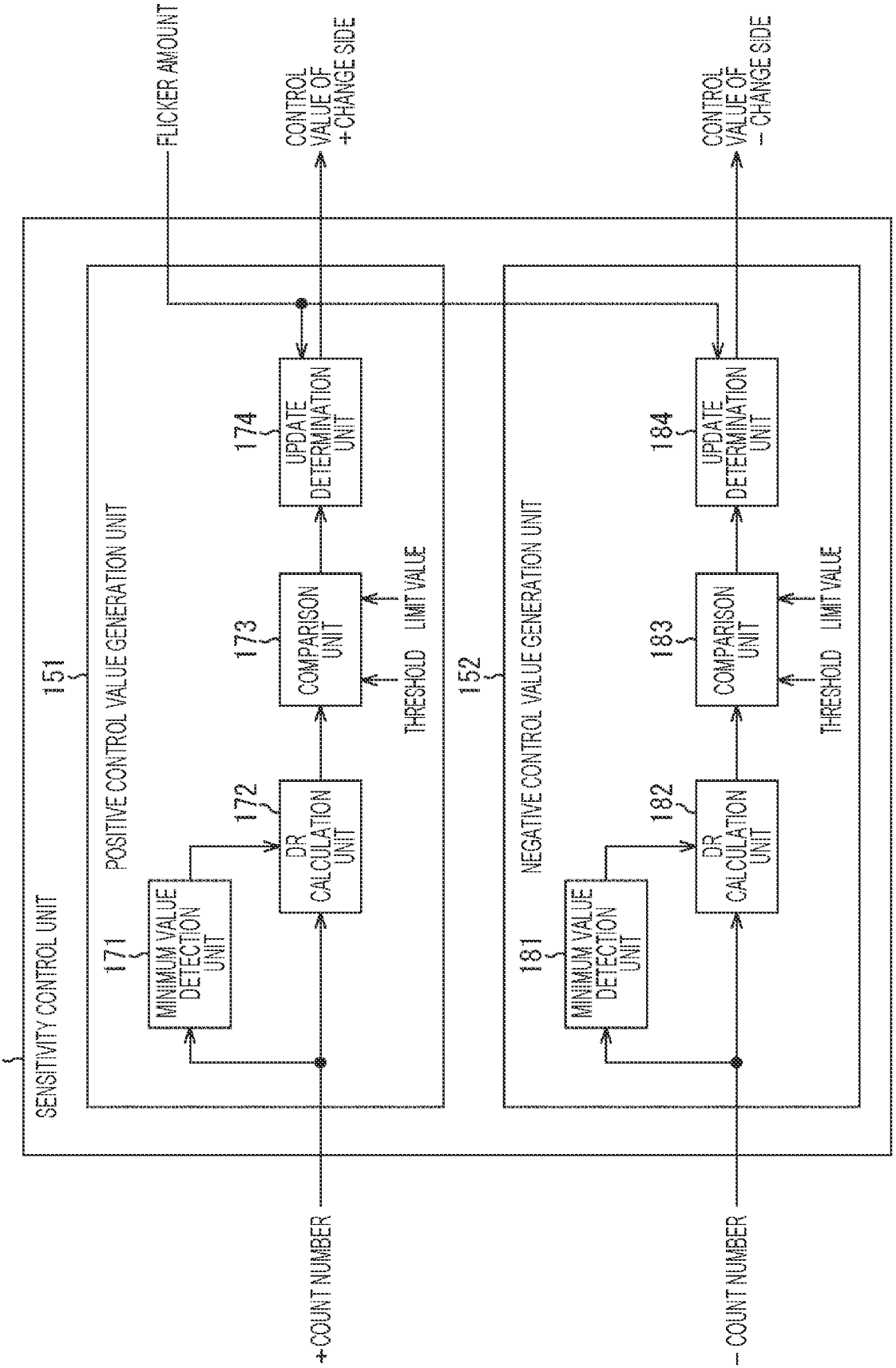
FIG. 14 is a block diagram illustrating a detailed configuration example of the sensitivity control unit.

FIG. 14 is a block diagram illustrating a detailed configuration example of the sensitivity control unit 34.

The sensitivity control unit 34 includes a positive control value generation unit 151 that generates the control value p_sense(i) for controlling the detection sensitivity of + change and a negative control value generation unit 152 that generates the control value n_sense(i) for controlling the detection sensitivity of − change.

The positive control value generation unit 151 includes a minimum value detection unit 171, a DR calculation unit 172, a comparison unit 173, and an update determination unit 174.

The negative control value generation unit 152 includes a minimum value detection unit 181, a DR calculation unit 182, a comparison unit 183, and an update determination unit 184.

As illustrated in FIG. 14, the positive control value generation unit 151 and the negative control value generation unit 152 have basically the same configuration.

To the sensitivity control unit 34, the + count number and the − count number are supplied from the event count unit 32, and the detected flicker amount is supplied from the flicker detection unit 33. The + count number from the event count unit 32 is input to the positive control value generation unit 151, and the − count number is input to the negative control value generation unit 152. Furthermore, the flicker amount from the flicker detection unit 33 is input to the update determination units 174 and 184.

First, the positive control value generation unit 151 will be described.

The minimum value detection unit 171 accumulates the sequentially input + count numbers in units of detection cycle DT, detects a minimum value min(DT(x)) of the + count number in every detection cycle DT, and supplies the minimum value min(DT(x)) to the DR calculation unit 172 (x=1, 2, 3, and so on). That is, the minimum value detection unit 171 performs the calculation of the above-described Formula (5) for every detection cycle DT.

The DR calculation unit 172 calculates the dynamic range DR(i) of each frame phase i of a current detection cycle DT(x) by subtracting the minimum value min(DT(x)) of the detection cycle DT(x) supplied from minimum value detection unit 171 from the + count number P_count(i) of each phase frame i of the current detection cycle DT(x) supplied from the event count unit 32. That is, the DR calculation unit 172 performs the calculation of the above-described Formula (6) for every detection cycle DT. The calculated dynamic range DR(i) of each frame phase i of the current detection cycle DT(x) is supplied to the comparison unit 173.

The comparison unit 173 compares the dynamic range DR(i) of each frame phase i of the current detection cycle DT(x) with the first threshold DR_TH1, and determines whether or not the dynamic range DR(i) is smaller than the first threshold DR_TH1. Then, in a case where the dynamic range DR(i) of each frame phase i is smaller than the first threshold DR_TH1, the comparison unit 173 calculates the control value p_sense(i) in each frame phase i of the next detection cycle DT(x+1).

Furthermore, the comparison unit 173 compares the dynamic range DR(i) of each frame phase i of the current detection cycle DT(x) with the second threshold DR_TH2, and determines whether or not the dynamic range DR(i) is larger than the second threshold DR_TH2. Then, in a case where the dynamic range DR(i) of each frame phase i is larger than the second threshold DR_TH2, the control value p_sense(i) in each frame phase i of the next detection cycle DT(x+1) is calculated.

That is, the comparison unit 173 calculates the control value p_sense'(i) in each frame phase i of the next detection cycle DT(x+1) by performing the calculation of the above-described Formulas (7) and (8) and supplies the control value p_sense'(i) to the update determination unit 174.

The update determination unit 174 determines, on the basis of the flicker amount EST_FL supplied from the flicker detection unit 33, whether flicker occurs. For example, in a case where the flicker amount EST_FL supplied from the flicker amount estimation unit 54 is larger than a predetermined flicker determination threshold FL_TH, the sensitivity control unit 34 determines that flicker occurs, and in a case where the flicker amount EST_FL is equal to or smaller than the flicker determination threshold FL_TH, the sensitivity control unit 34 determines that no flicker occurs. Alternatively, in a case where a state where the flicker amount EST_FL calculated in units of the detection cycle DT is larger than the flicker determination threshold FL_TH occurs a predetermined number of times or more within a predetermined period, it may be determined that flicker occurs.

Then, in a case where it is determined that flicker occurs, the update determination unit 174 performs control to update the control value for controlling the threshold of the luminance change as the sensitivity parameter for every frame phase. That is, the update determination unit 174 supplies, as the updated control value p_sense(i), the control value p_sense'(i), which is supplied from the comparison unit 173, in each frame phase i of the next detection cycle DT(x+1) to each detection circuit 22 of the pixel array unit 11.

The operations of the minimum value detection unit 181, the DR calculation unit 182, the comparison unit 183, and the update determination unit 184 of the negative control value generation unit 152 are similar to the operations of the minimum value detection unit 171, the DR calculation unit 172, the comparison unit 173, and the update determination unit 174 of the positive control value generation unit 151, except that the − count number is used instead of the + count number, and thus, description thereof is omitted. However, as illustrated in FIG. 13, the polarities are opposite between the control of the detection sensitivity of + change and the control of the detection sensitivity of − change, and thus the magnitude relationship of the control values is opposite.

In the negative control value generation unit 152, the control value n_sense(i) of the − change side, that is, the − side threshold Vrefn(i) in each frame phase i of the next detection cycle DT(x+1) is determined and supplied to each detection circuit 22 of the pixel array unit 11.

5. Processing Flow of Flicker Control Process

Figure 15:
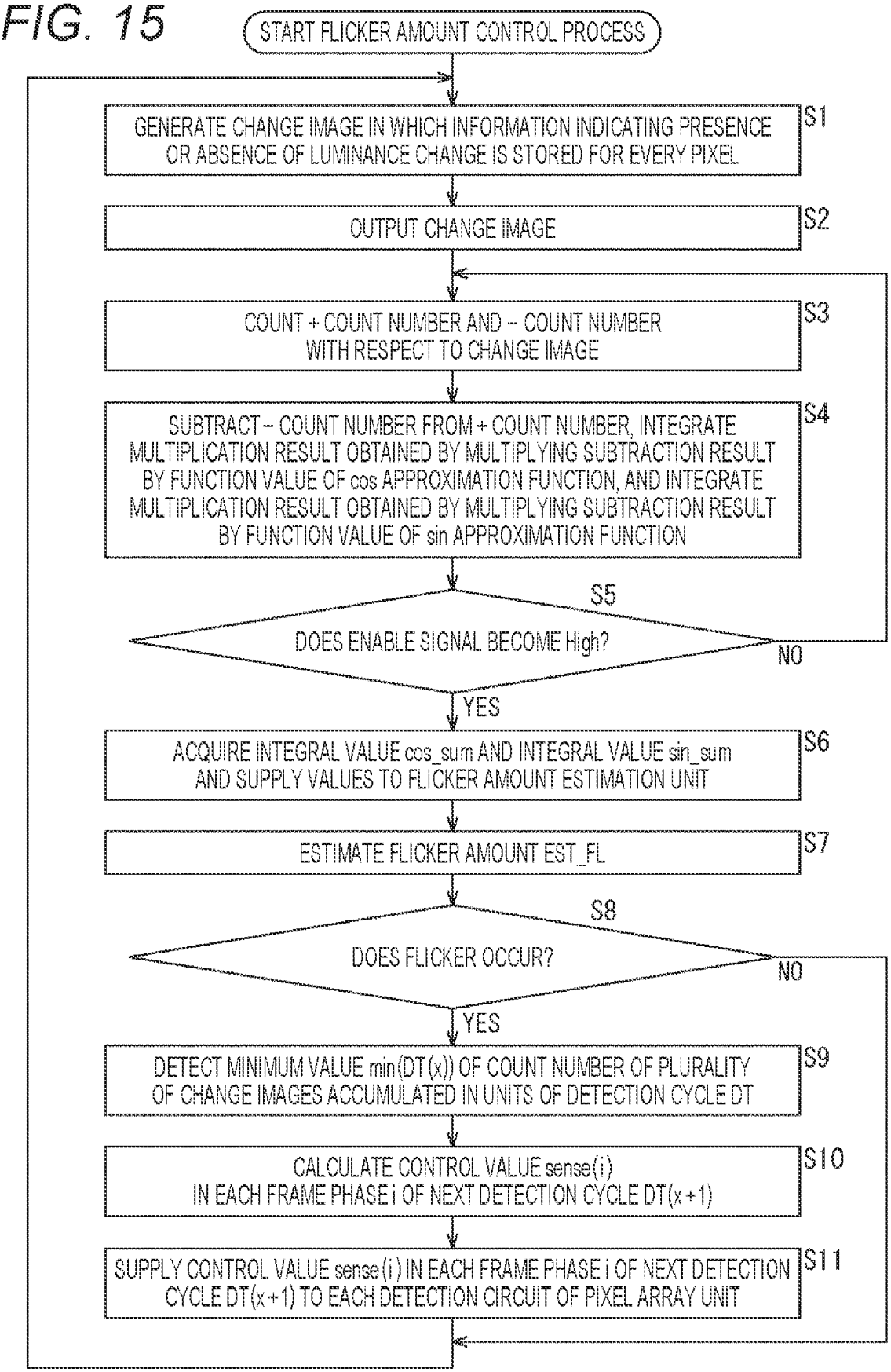
FIG. 15 is a flowchart illustrating a flicker control process by the event detection sensor in FIG. 1.

The flicker control process by the event detection sensor 1 will be described with reference to the flowchart in FIG. 15. This process is started, for example, when the event detection sensor 1 is instructed to start event detection (imaging).

First, in step S1, the pixel array unit 11 performs exposure in a predetermined exposure time corresponding to the frame rate, and generates a change image in which information indicating the presence or absence of a luminance change is stored for every pixel. The generated change image is supplied to the signal processing circuit 12. The pixel value of each pixel of the changed image indicates any of + change, − change, or no change.

In step S2, the event data acquisition unit 31 acquires the change image supplied from the pixel array unit 11, outputs the change image to the outside of the event detection sensor 1, and supplies the change image to the event count unit 32.

In step S3, the event count unit 32 counts the + count number and the − count number with respect to the change image supplied from the event data acquisition unit 31, and supplies the counting result to the flicker detection unit 33 and the sensitivity control unit 34.

In step S4, the flicker detection unit 33 subtracts the − count number from the + count number supplied from the event count unit 32, integrates the multiplication result obtained by multiplying the subtraction result by the function value of the cos approximation function (cos function), and integrates the multiplication result obtained by multiplying the subtraction result by the function value of the sin approximation function (sin function).

More specifically, the subtractor 51 of the flicker detection unit 33 subtracts the − count number from the + count number, and outputs the subtraction result to the multipliers 71 and 72 of the integrating unit 53. The multiplier 71 supplies, to the integrator 73, the multiplication result obtained by multiplying the subtraction result of the count number supplied from the subtractor 51 by the function value of the cos approximation function generated by the convolution coefficient generation unit 52, and the integrator 73 integrates the multiplication result supplied from the multiplier 71. Furthermore, the multiplier 72 supplies, to the integrator 74, the multiplication result obtained by multiplying the subtraction result of the count number supplied from the subtractor 51 by the function value of the sin approximation function generated by the convolution coefficient generation unit 52, and the integrator 74 integrates the multiplication result supplied from the multiplier 72.

In step S5, the flicker detection unit 33 determines whether the enable signal supplied from the convolution coefficient generation unit 52 becomes High. The fact that the enable signal becomes High indicates that the changed image of the number of frames corresponding to the detection cycle DT is input from the pixel array unit 11.

In a case where it is determined in step S5 that the enable signal is not High, the processing returns to step S3, and the above-described steps S3 to S5 are repeated.

On the other hand, in a case where it is determined in step 35 that the enable signal is High, the processing proceeds to step S6, the output unit 75 of the flicker detection unit 33 acquires the integral value cos_sum of the integrator 73 and supplies the integral value cos_sum to the flicker amount estimation unit 54, and the output unit 76 acquires the integral value sin_sum of the integrator 74 and supplies the integral value sin_sum to the flicker amount estimation unit 54.

In step S7, the flicker amount estimation unit 54 of the flicker detection unit 33 estimates the flicker amount occurring at the flicker frequency of the detection target by using the respective integration results supplied from the output units 75 and 76. Specifically, the flicker amount estimation unit 54 calculates the flicker amount EST_FL by the above—described Formula (1) or Formula (2). The calculated flicker amount EST_FL is output to the outside of the event detection sensor 1 and also supplied to the sensitivity control unit 34.

In step S8, the sensitivity control unit 34 determines, on the basis of the flicker amount EST_FL supplied from the flicker amount estimation unit 54, whether or not flicker occurs. For example, in a case where the flicker amount EST_FL supplied from the flicker amount estimation unit 54 is larger than a predetermined flicker determination threshold FL_TH, the sensitivity control unit 34 determines that flicker occurs, and in a case where the flicker amount EST_FL is equal to or smaller than the flicker determination threshold FL_TH, the sensitivity control unit 34 determines that no flicker occurs. Alternatively, in a case where a state where the flicker amount EST_FL calculated in units of the detection cycle DT is larger than the flicker determination threshold FL_TH occurs a predetermined number of times or more within a predetermined period, it may be determined that flicker occurs.

In a case where it is determined in step S8 that no flicker occurs, steps S9 to S11 as described later are skipped, and the processing returns to step S1.

On the other hand, in a case where it is determined in step S8 that flicker occurs, the processing of the following steps S9 to S11 is executed.

In step S9, the sensitivity control unit 34 detects the minimum value min(DT(x)) of the count number of a plurality of change images accumulated in units of the detection cycle DT for each of the + count number and the − count number. Specifically, the minimum value detection unit 171 detects the minimum value min(DT(x)) of the + count number of the plurality of change images accumulated in units of the detection cycle DT, and the minimum value detection unit 181 detects the minimum value min(DT(x)) of the − count number of the plurality of change images accumulated in units of the detection cycle DT.

Next, in step S10, the sensitivity control unit 34 calculates the control value sense(i) in each frame phase i of the next detection cycle DT(x+1).

For example, in the positive control value generation unit 151 that processes the + count number, the DR calculation unit 172 calculates the dynamic range DR(i) of the + count number of each frame phase i of the detection cycle DT(x) by subtracting the minimum value min(DT(x)) of the + count number from the + count number P_count(i) of each phase frame i of the current detection cycle DT(x). The comparison unit 173 compares the dynamic range DR(i) of the + count number of each frame phase i of the current detection cycle DT(x) with the first threshold DR_TH1 and the second threshold DR_TH2 and calculates the control value p_sense(i) in each frame phase i of the next detection cycle DT(x+1).

Similarly, for the negative control value generation unit 152 that processes the count number, the DR calculation unit 182 and the comparison unit 183 calculate the control value n_sense(i) in each frame phase i of the next detection cycle DT(x+1).

Next, in step S11, the update determination units 174 and 184 of the sensitivity control unit 34 supply, as the updated control value sense(i), the control value sense(i) in each frame phase i of the next detection cycle DT(x+1) supplied from the respective comparison units 173 and 183 to each detection circuit 22 of the pixel array unit 11 at the timing corresponding to each frame phase i of the next detection cycle DT(x+1). More specifically, the update determination unit 174 supplies the control value p_sense(i) of the + change side, that is, the + side threshold Vrefp to each detection circuit 22, and the update determination unit 184 supplies the control value n_sense(i) of the − change side, that is, the − side threshold Vrefn to each detection circuit 22.

After step S11, the processing returns to step S1, and the above-described processing is repeated.

6. Example of Processing Result of Flicker Control Process

Figure 16:
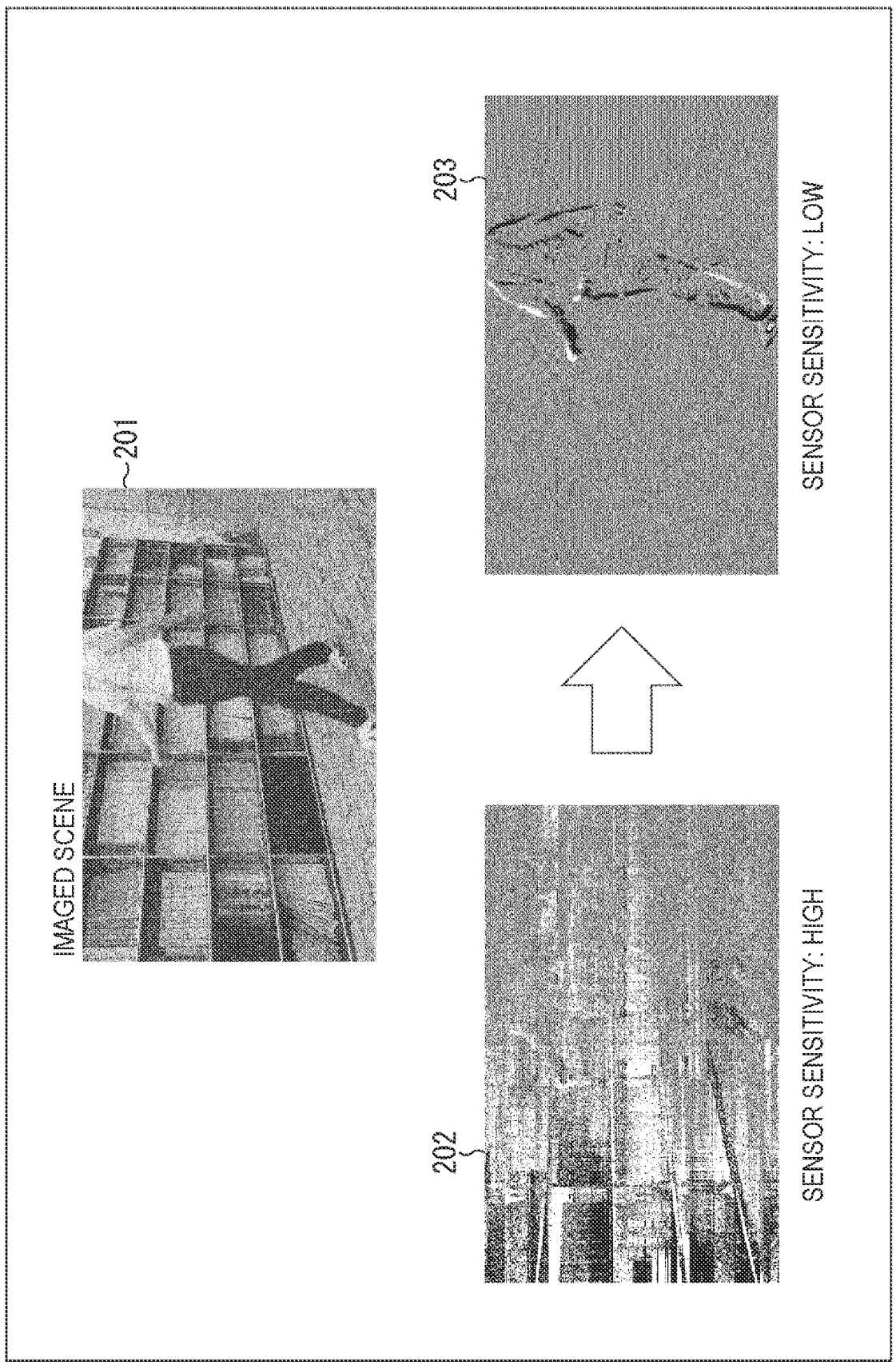
FIG. 16 is a diagram illustrating an example of a processing result of the flicker control process by the event detection sensor in FIG. 1.

FIG. 16 illustrates an example of a processing result of the flicker control process by the event detection sensor 1.

In the imaged scene indicated by the image 201 in FIG. 16, event detection by the event detection sensor 1 is executed under an environment using the light source having a power supply frequency of 50 Hz. The imaged scene shows a person walking in front of the background from right to left in the screen. An image 201 is an image captured by a general CMOS image sensor.

An image 202 is frame data (frame image) of the change image by the event detection sensor 1. The image 202 is in a state where the sensitivity of the event detection sensor 1 is high, an event is detected in the entire screen, and the event in which a moving person is detected is buried in noise.

An image 203 is frame data (frame image) of the change image after the sensor sensitivity is decreased below that of the image 202 by the flicker control process.

In the image 203, the noise capturing the flicker is reduced, and only the movement (mainly moving person) larger than the flicker is detected as an event.

Therefore, according to the flicker control process, the flicker amount (flicker information) can be detected from the change image output at a constant cycle. Then, in a case where the flicker amount is large, flicker can be suppressed, and only a superior event can be extracted. Furthermore, it is possible to independently perform specialized control for each of + change and − change at the timing at which each of + change and − change is likely to occur.

7. Another Configuration Example of Event Detection Sensor

Figure 17:
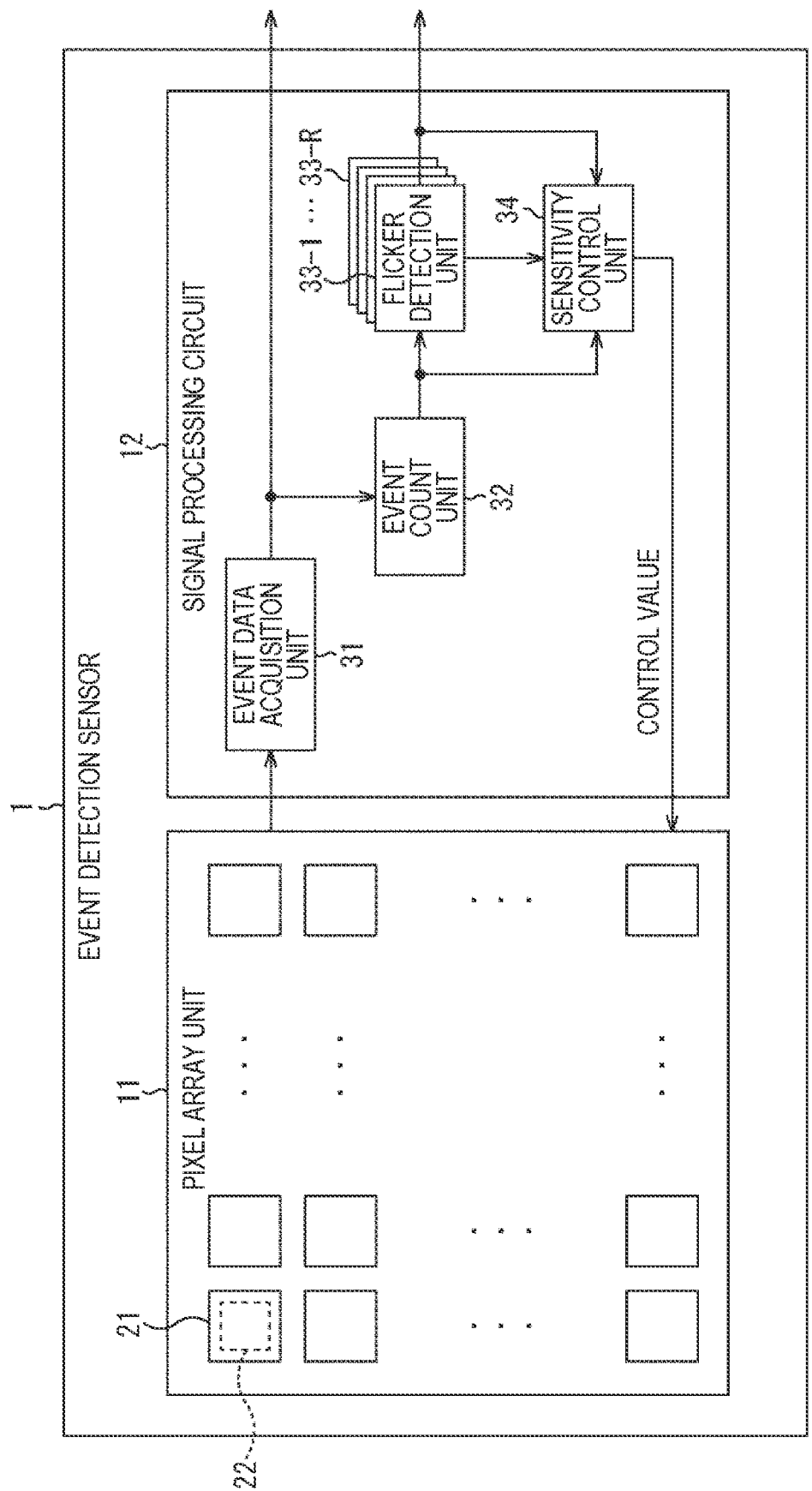
FIG. 17 is a block diagram illustrating a configuration example as another embodiment of the event detection sensor to which the present technology is applied.

FIG. 17 is a block diagram illustrating a configuration example as another embodiment of the event detection sensor 1.

In FIG. 17, the portions corresponding to those in FIG. 1 are designated by the same reference numerals, and the description thereof will be appropriately omitted.

In FIG. 17, the flicker detection units 33-1 to 33-R (R>1) are provided, and a plurality of (R) flicker detection units 33 is provided, which is different from the event detection sensor 1 in FIG. 1, but other points are the same as those of the event detection sensor 1 in FIG. 1.

The event detection sensor 1 in FIG. 17 can detect a plurality of flicker frequencies by including the plurality of flicker detection units 33-1 to 23-R. That is, the flicker detection units 33-1 to 23-R have different flicker frequencies set as detection targets.

For example, when the frequencies of the flicker detected by the flicker detection units 33-1 and 33-2 are set to 100 Hz and 120 Hz with R=2, it is possible to detect the flickers corresponding to the western Japan area and the east Japan area.

Alternatively, when the frequencies of the flickers detected by the flicker detection units 33-1 to 33-R are set to 25 Hz, 50 hz, 100 Hz, 200 Hz, 400 Hz, . . . , or the like, only events of arbitrary frequencies can be detected, and frequency analysis including flickers becomes possible.

8. Configuration Example of Imaging Device

Figure 18:
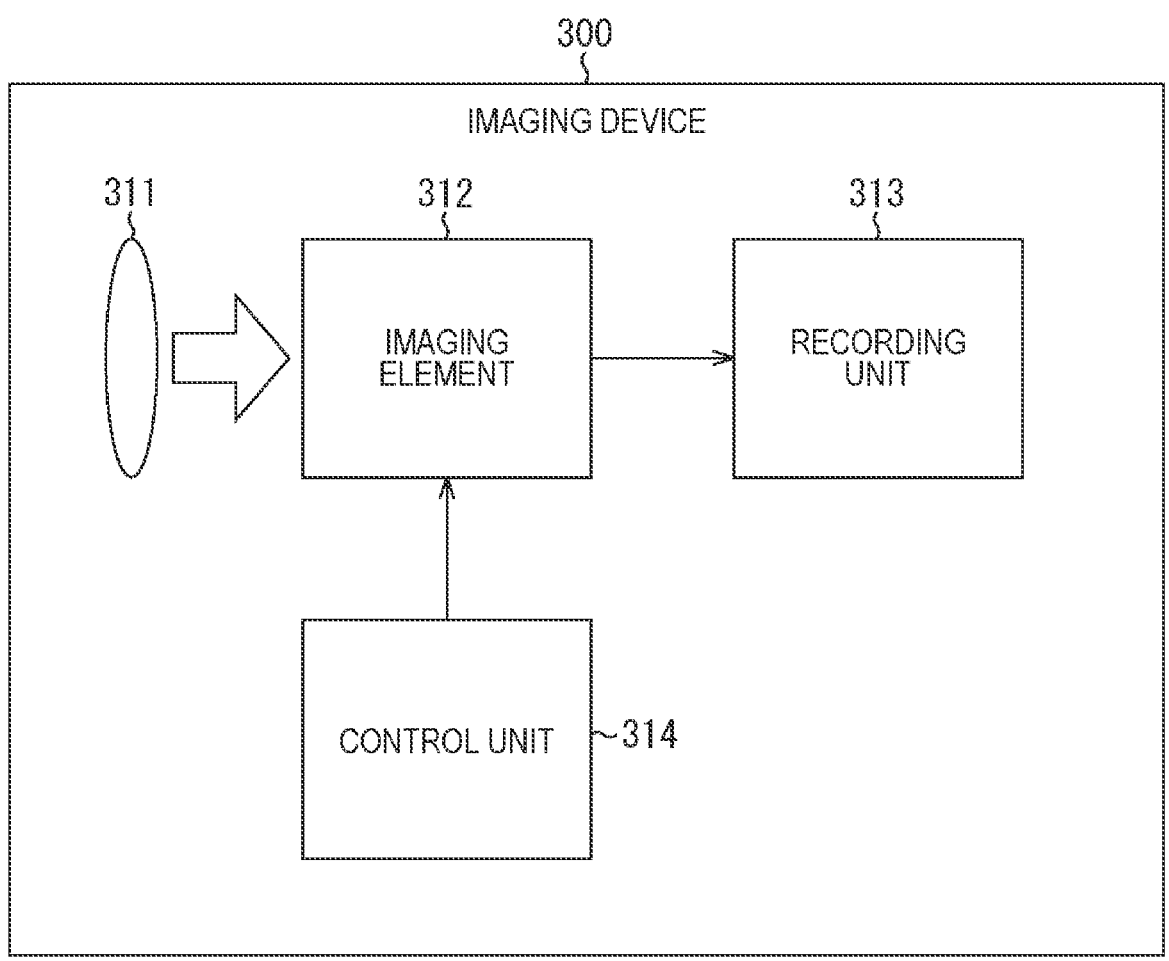
FIG. 18 is a block diagram illustrating a configuration example of an imaging device including the event detection sensor as an imaging element.

FIG. 18 is a block diagram illustrating a configuration example of an imaging device including the event detection sensor 1 described above as an imaging element.

An imaging device 300 includes an optical unit 311, an imaging element 312, a recording unit 313, and a control unit 314. As the imaging device 300, for example, a camera mounted on an industrial robot, an in-vehicle camera or the like is assumed.

The optical unit 311 condenses light from the subject and causes the light to enter the imaging element 312. The imaging element 312 photoelectrically converts the incident light incident via the optical unit 311 to generate image data, and supplies the image data to the recording unit 313. As the imaging element 312, the event detection sensor 1 in FIGS. 1, 17, or the like is mounted.

The recording unit 313 records and accumulates the image data supplied from the imaging element 312 in a predetermined recording medium. The control unit 314 controls the imaging element 312. For example, the control unit 314 instructs the imaging element 312 to start and end imaging, and specifies a frame rate at the time of imaging.

Figure 19:
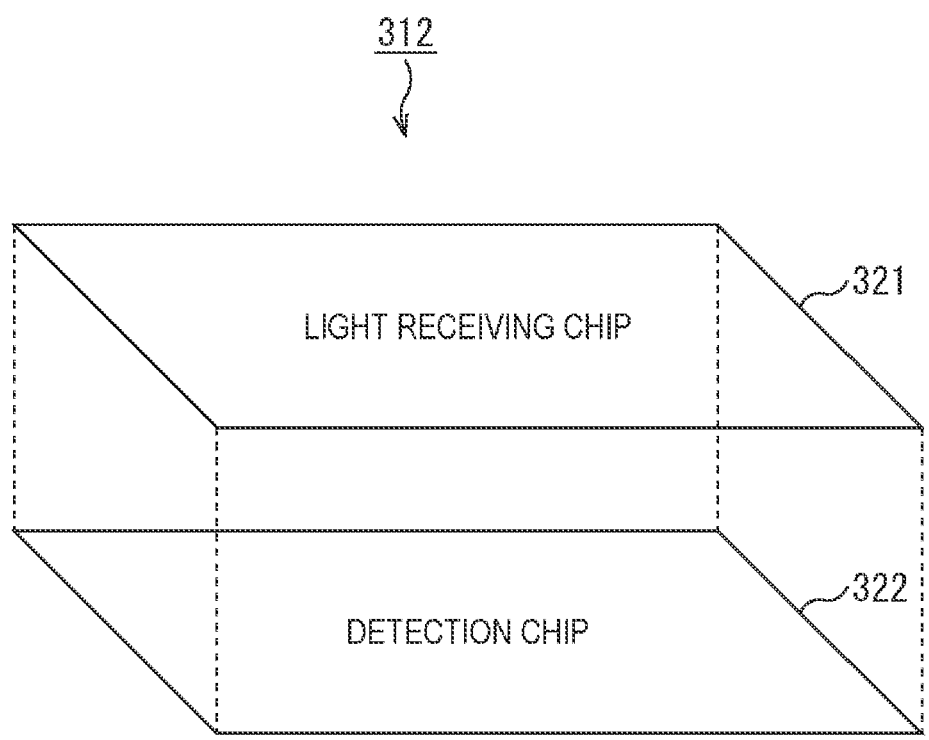
FIG. 19 is a perspective view illustrating a schematic configuration example of the imaging element in FIG. 18.

FIG. 19 is a perspective view illustrating a schematic configuration example of the imaging element 312.

The imaging element 312 has a stacked structure in which a light receiving chip 321 and a detection chip 322 are bonded and stacked. The light receiving chip 321 and the detection chip 322 are electrically connected via a connection portion such as a via, Cu—Cu bonding, or a bump.

FIG. 20 is a plan view illustrating a configuration example of the light receiving chip 321.

The light receiving chip 321 includes a light receiving unit 341 formed in a chip central portion and one or more via arrangement units 342 formed in an outer peripheral portion outside the light receiving unit 341. In the example of FIG. 20, three via arrangement units 342 are provided at corners of the chip outer periphery.

In the light receiving unit 341, a plurality of shared blocks 343 is arranged in a two-dimensional lattice pattern. In the via arrangement unit 342, a via electrically connected to the detection chip 322 is arranged.

A plurality of logarithmic response units 351 is arranged in each of the shared blocks 343. For example, four logarithmic response units 351 are arranged in 2 rows×2 columns in one shared block 343. These four logarithmic response units 351 share a circuit on the detection chip 322. Details of the shared circuit will be described later. Note that the number of logarithmic response units 351 in the shared block 343 is not limited to four.

The logarithmic response unit 351 generates a voltage signal corresponding to a logarithmic value of a photocurrent. A pixel address including a row address and a column address is assigned to each logarithmic response unit 351.

Figure 21:
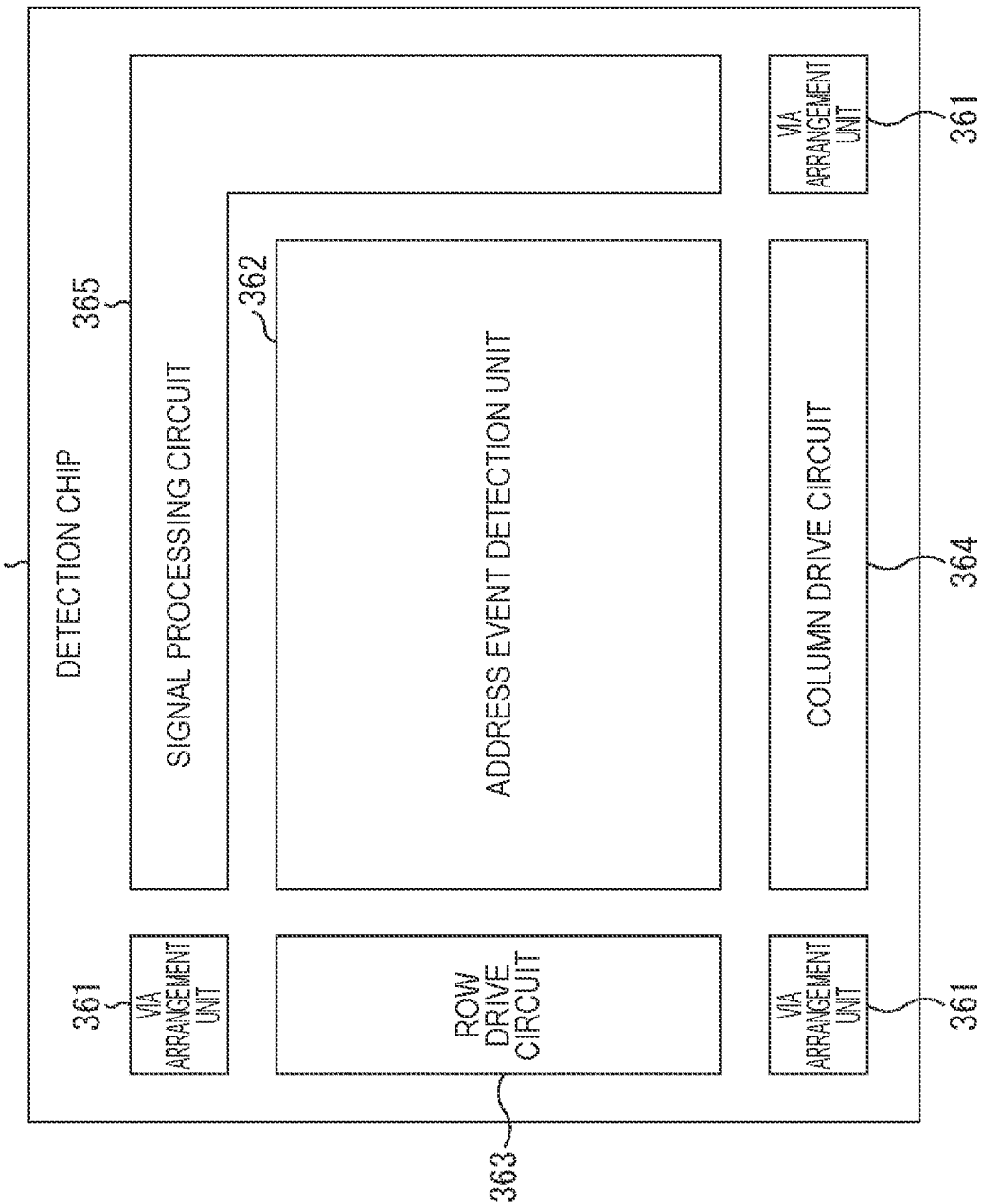
FIG. 21 is a plan view illustrating a configuration example of a detection chip.

FIG. 21 is a plan view illustrating a configuration example of the detection chip 322.

The detection chip 322 includes one or more via arrangement units 361, an address event detection unit 362, a row drive circuit 363, a column drive circuit 364, and a signal processing circuit 365.

The via arrangement unit 361 is provided at a position corresponding to the via arrangement unit 342 of the light receiving chip 321, and is electrically connected to the light receiving chip 321 via a via. In FIG. 21, the via arrangement units 361 are provided at positions corresponding to the three via arrangement units 342 in FIG. 20, and a total of three via arrangement units 361 are formed on the detection chip 322.

The address event detection unit 362 detects the presence or absence of an event for every logarithmic response unit 351 of the light receiving chip 321 and generates a detection signal indicating a detection result. The detection signal is generated as ternary (2-bit) information indicating any of + change, − change, or no change.

The row drive circuit 363 selects a predetermined row address of the address event detection unit 362 and outputs a detection signal of the selected row address to the signal processing circuit 365.

The column drive circuit 364 selects a predetermined column address of the address event detection unit 362 and outputs a detection signal of the selected column address to the signal processing circuit 365.

The signal processing circuit 365 executes predetermined signal processing on the detection signal output from the address event detection unit 362. For example, the signal processing circuit 365 acquires image data in which the detection signal is a pixel signal. Then, the signal processing circuit 365 executes a process of detecting (estimating) the flicker amount of the predetermined cycle on the basis of the image data, and controls the address event detection unit 362 to suppress the flicker in a case where the flicker of the predetermined cycle occurs. Therefore, in the imaging element 312, the process executed by the signal processing circuit 12 in FIG. 1 is executed by the signal processing circuit 365.

Figure 22:
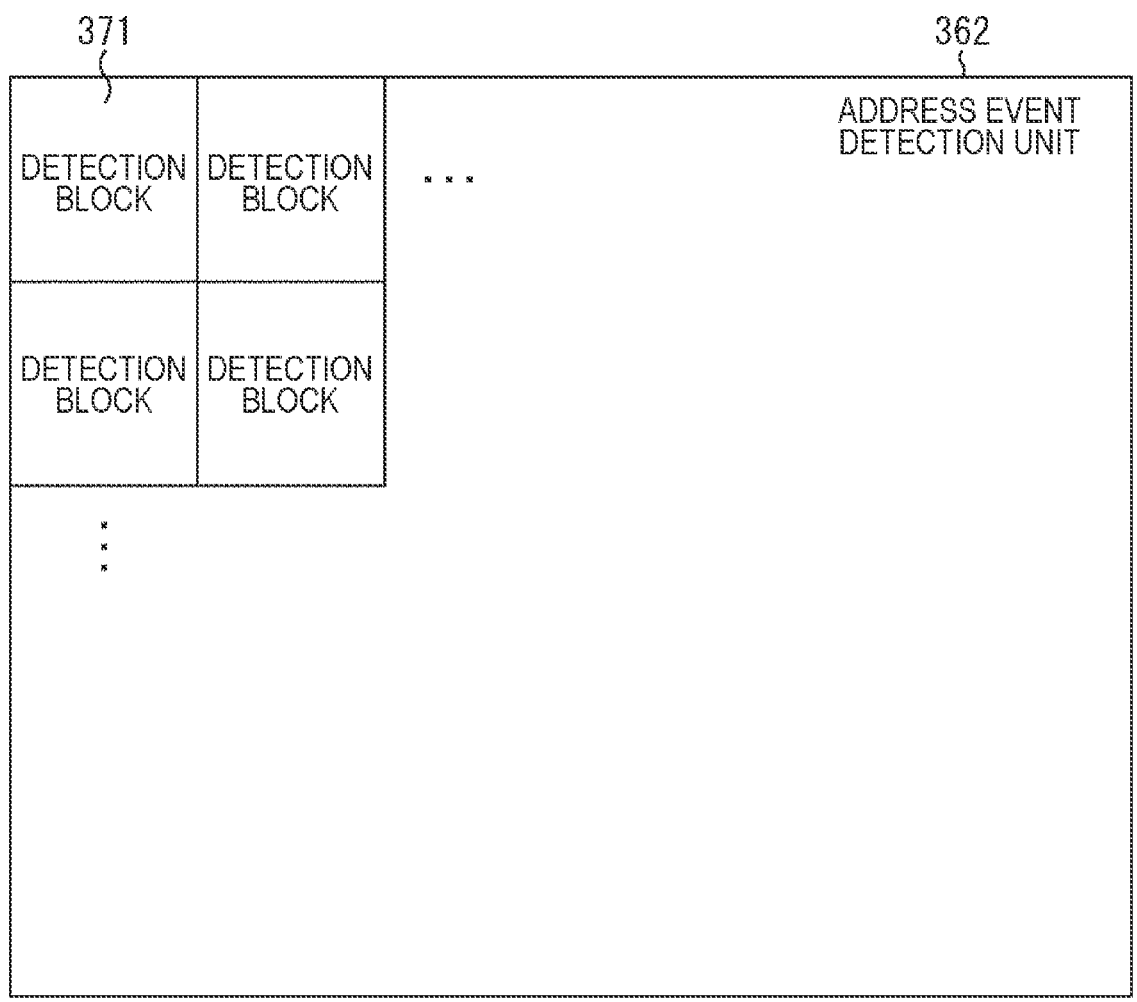
FIG. 22 is a plan view illustrating details of an address event detection unit.

FIG. 22 is a plan view illustrating details of the address event detection unit 362.

In the address event detection unit 362, a plurality of detection blocks 371 is arranged in a two-dimensional lattice pattern. The detection block 371 is arranged for every shared block 343 on the light receiving chip 321. That is, in a case where the number of shared blocks 343 on the light receiving chip 321 is N (N is an integer), N detection blocks 371 are arranged in the detection chip 322. Each detection block 371 is electrically connected to the corresponding shared block 343 by a via, Cu—Cu bonding, or the like.

Figure 23:
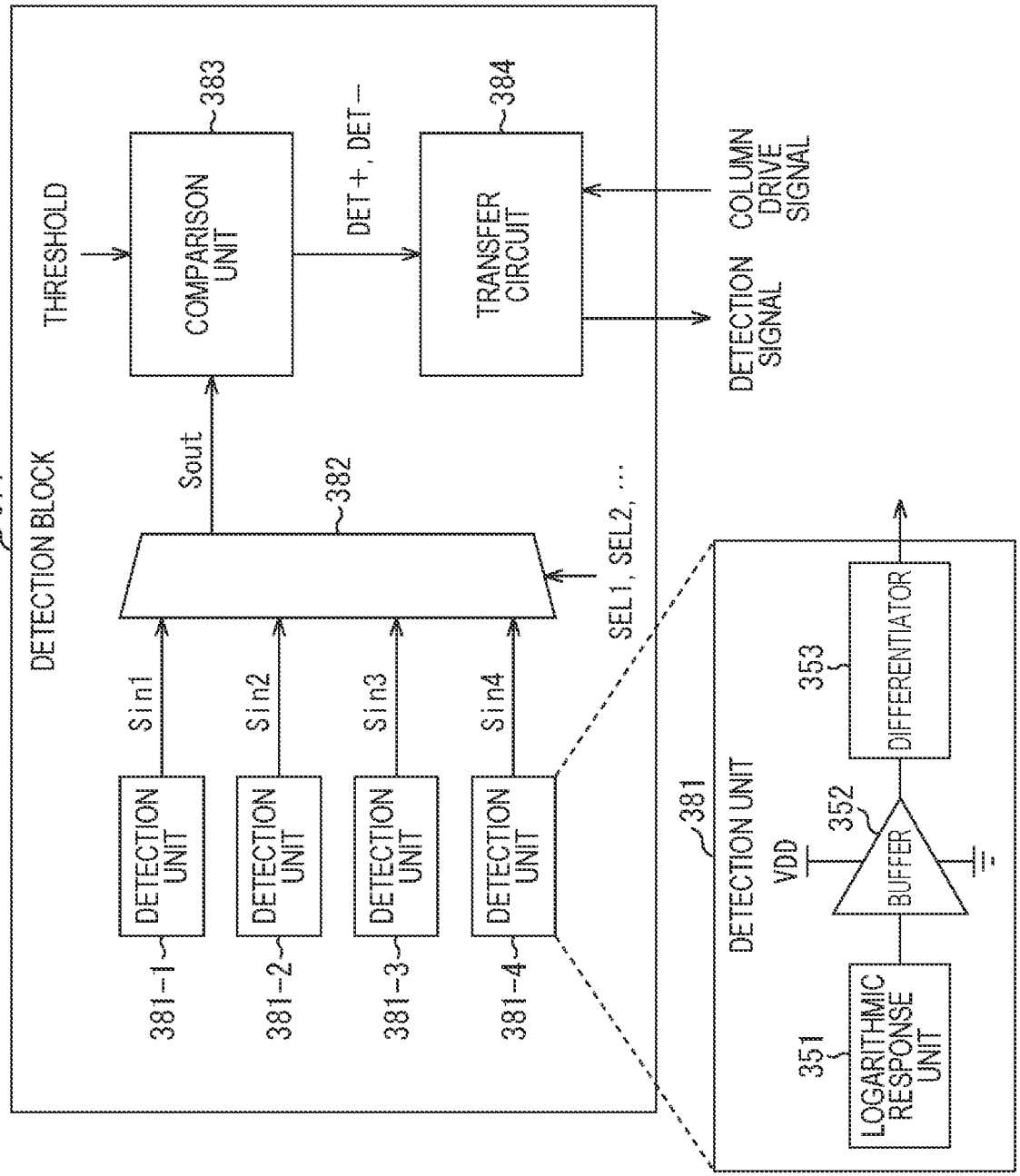
FIG. 23 is a block diagram illustrating a configuration example of a detection block.

FIG. 23 is a block diagram illustrating a configuration example of one detection block 371.

The detection block 371 includes four detection units 381, a selector 382, a comparison unit 383, and a transfer circuit 384.

Each of the four detection units 381 includes the logarithmic response unit 351, a buffer 352, and a differentiator 353. The logarithmic response unit 351 generates a voltage signal corresponding to the logarithmic value of the photocurrent and outputs the voltage signal to the buffer 352. The buffer 352 buffers the voltage signal from the logarithmic response unit 351, and outputs the voltage signal to the differentiator 353. With the buffer 352, it is possible to secure the isolation of noise accompanying the switching operation in the subsequent stage and to improve the driving force for driving the subsequent stage. Note that the buffer 352 can be omitted. The differentiator 353 outputs the change amount of the voltage signal (the change amount of the luminance change) as a differential signal Sin.

As illustrated in FIG. 20, the logarithmic response unit 351 is also provided in the shared block 343 of the light receiving chip 321, and is dispersedly arranged in the shared block 343 of the light receiving chip 321 and the detection unit 381 of the detection block 371. Therefore, the four detection units 381 correspond to the logarithmic response units 351 of 2 rows×2 columns in the shared block 343. In a case where each of the four detection units 381 is distinguished, the detection units are referred to as detection units 381-1 to 381-4, and the differential signal Sin output from each of the detection units 381-1 to 381-4 is distinguished from a differential signal Sin1, a differential signal Sin2, a differential signal Sin3, and a differential signal Sin4.

The selector 382 selects the output of any one of the four detection units 381 according to selection signals SEL1 to SEL4 from the row drive circuit 363, and supplies the acquired differential signal Sin to the comparison unit 383 as a differential signal Sout. Specifically, the selector 382 selects the differential signal Sin1 from the detection unit 381-1 in a case where the selection signal SEL1 is supplied from the row drive circuit 363, selects the differential signal Sin2 from the detection unit 381-2 in a case where the selection signal SEL2 is supplied, selects the differential signal Sin3 from the detection unit 381-3 in a case where the selection signal SEL3 is supplied, and selects the differential signal Sin4 from the detection unit 381-4 in a case where the selection signal SEL4 is supplied, and supplies the differential signal as the differential signal Sout to the comparison unit 383.

The comparison unit 383 compares the differential signal Sout supplied from the selector 382 with a predetermined threshold, and supplies a comparison result to the transfer circuit 384. As the predetermined threshold to be compared with the differential signal Sout, the above-described + side threshold Vrefp and − side threshold Vrefn are supplied from the sensitivity control unit 34 of the signal processing circuit 365 (signal processing circuit 12).

The comparison unit 383 outputs, to the transfer circuit 384, a detection signal DET+ indicating whether or not the differential signal Sout indicating the change amount of the luminance change exceeds the + side threshold Vrefp, and outputs, to the transfer circuit 384, a detection signal DET− indicating whether or not the differential signal Sout exceeds the − side threshold Vrefn.

The transfer circuit 384 transfers (outputs) the detection signal to the signal processing circuit 365 according to a column drive signal from the column drive circuit 364. Here, the transfer circuit 384 generates the detection signal as the ternary (2 bits) information indicating any of + change, − change, and no change, and outputs the detection signal to the signal processing circuit 365. Specifically, the transfer circuit 384 outputs a detection signal indicating + change in a case where the detection signal DET+ indicating that the change amount of the luminance change exceeds the + side threshold Vrefp is supplied from the comparison unit 383, outputs a detection signal indicating − change in a case where the detection signal DET− indicating that the change amount exceeds the − side threshold Vrefn is supplied, and outputs a detection signal indicating no change in a case where neither the + side threshold Vrefp nor the − side threshold Vrefn is exceeded.

Figure 24:
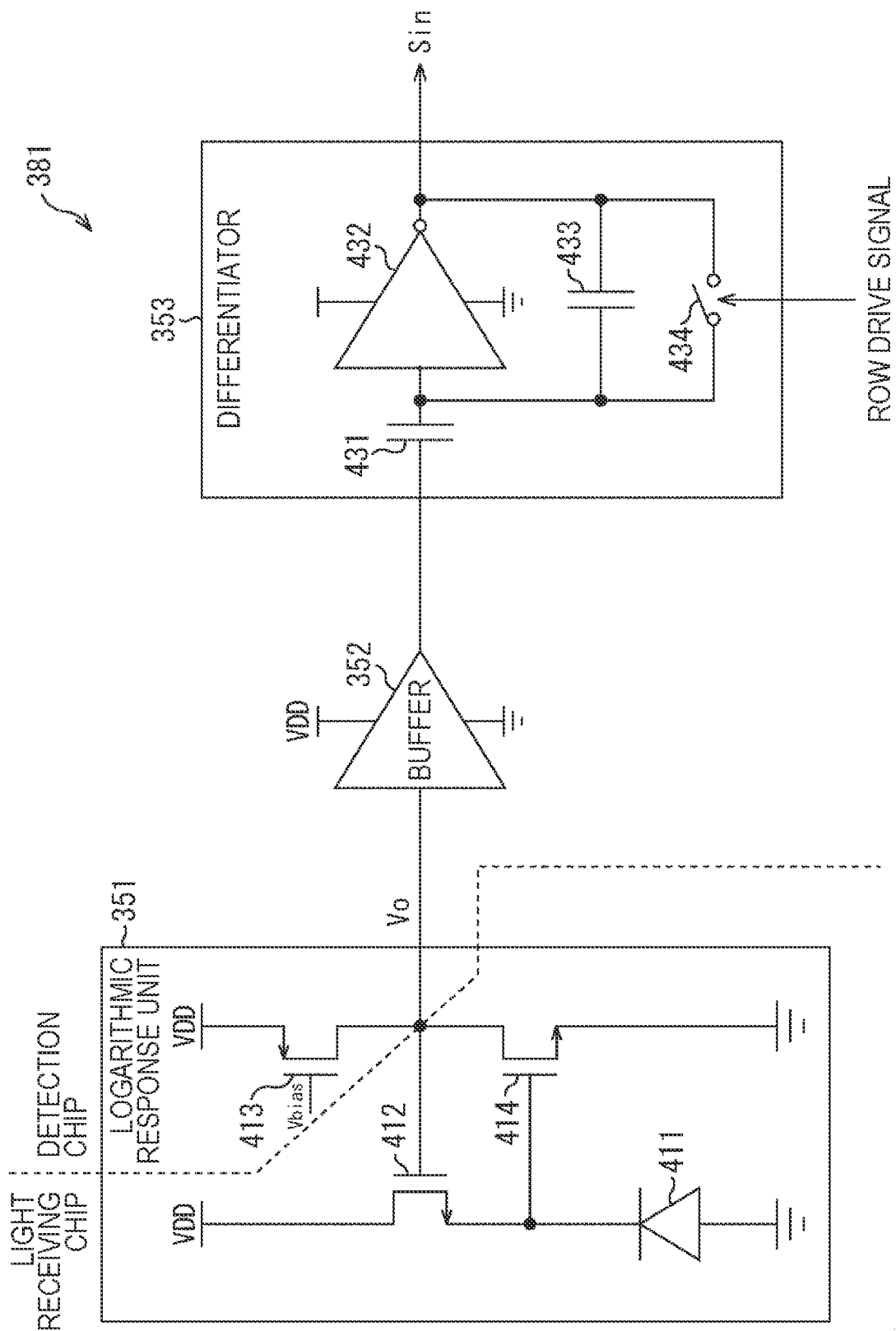
FIG. 24 is a circuit diagram illustrating a detailed configuration of a detection unit.

FIG. 24 is a circuit illustrating a detailed configuration of the detection unit 381, and particularly illustrates a detailed configuration example of the logarithmic response unit 351 and the differentiator 353.

The logarithmic response unit 351 includes a photo diode (PD) 411 as a photoelectric conversion element and FETs 412 to 414. As the FETs 412 and 414, for example, an N-type metal oxide semiconductor (NMOS) FET can be adopted, and as the FET 413, for example, a P-type metal oxide semiconductor (PMOS) FET can be adopted.

The PD 411 receives incident light, performs photoelectric conversion, and generates and flows a photocurrent as an electric signal. The logarithmic response unit 351 converts the photocurrent from the PD 411 into a voltage (hereinafter, also referred to as an optical voltage) Vo corresponding to the logarithm of the photocurrent, and outputs the voltage Vo to the differentiator 353 via the buffer 352.

The source of the FET 412 is connected to the gate of the FET 414, and a photocurrent by the PD 411 flows through a connection point between the source of the FET 412 and the gate of the FET 414. The drain of the FET 412 is connected to a power supply VDD, and the gate thereof is connected to the drain of the FET 414.

The source of the FET 413 is connected to the power supply VDD, and the drain thereof is connected to a connection point between the gate of the FET 412 and the drain of the FET 414. A predetermined bias voltage Vbias is applied to the gate of the FET 413. The source of the FET 414 is grounded.

The drain of the FET 412 is connected to the power supply VDD side and is a source follower. The PD 411 is connected to the source of the FET 412 which is the source follower, and therefore, a photocurrent due to a charge generated by the photoelectric conversion of the PD 411 flows through (the drain to the source of) the FET 412. The FET 412 operates in a subthreshold region, and the optical voltage Vo corresponding to the logarithm of the photocurrent flowing through the FET 412 appears at the gate of the FET 412. As described above, in the logarithmic response unit 351, the photocurrent from the PD 411 is converted into the optical voltage Vo corresponding to the logarithm of the photocurrent by the FET 412.

The optical voltage Vo is output from the connection point between the gate of the FET 412 and the drain of the FET 414 to the differentiator 353 via the buffer 352.

With respect to the optical voltage Vo from the logarithmic response unit 351, the differentiator 353 calculates a difference between a current optical voltage and an optical voltage at a timing different by a minute time from a current timing, and outputs a difference signal Vout corresponding to the difference.

The differentiator 353 includes a capacitor 431, an operational amplifier 432, a capacitor 433, and a switch 434.

One end of the capacitor 431 is connected to the output of the buffer 352, and the other end is connected to the input terminal of the operational amplifier 432. Therefore, the optical voltage Vo is input to the (inverted) input terminal of the operational amplifier 432 via the capacitor 431.

The output terminal of the operational amplifier 432 is connected to the selector 382 of FIG. 23.

One end of the capacitor 433 is connected to the input terminal of the operational amplifier 432, and the other end is connected to the output terminal of the operational amplifier 432.

The switch 434 is connected to the capacitor 433 to turn on/off a connection between both ends of the capacitor 433. The switch 434 turns on/off the connection between both ends of the capacitor 433 by turning on/off according to the row drive signal of the row drive circuit 363.

The capacitor 433 and the switch 434 configure a switched capacitor. When the switch 434 that has been turned off is temporarily turned on and turned off again, the capacitor 433 is reset to a state where electric charge is discharged, and electric charge can be newly accumulated.

The optical voltage Vo of the capacitor 431 on the logarithmic response unit 351 side when the switch 434 is turned on is denoted by Vinit, and the capacitance (electrostatic capacitance) of the capacitor 431 is denoted by C1. The input terminal of the operational amplifier 432 is virtually grounded, and a charge Qinit accumulated in the capacitor 431 in a case where the switch 434 is turned on is expressed by Formula (9).

$$Q\text{init}=C1\times V\text{init} \qquad (9)$$

Furthermore, in a case where the switch 434 is on, both ends of the capacitor 433 are short-circuited, so that the charge accumulated in the capacitor 433 becomes zero.

Thereafter, when the optical voltage Vo of the capacitor 431 on the logarithmic response unit 351 side in a case where the switch 434 is turned off is denoted by Vafter, a charge Qafter accumulated in the capacitor 431 when the switch 434 is turned off is expressed by Formula (10).

$$Q\text{after}=C1\times V\text{after} \qquad (10)$$

When the capacitance of the capacitor 433 is denoted by C2, a charge Q2 accumulated in the capacitor 433 is expressed by Formula (11) by using the difference signal Vout which is the output voltage of the operational amplifier 432.

$$Q2=-C2\times V\text{out} \qquad (11)$$

Before and after the switch 434 is turned off, the total charge amount of the charge of the capacitor 431 and the charge of the capacitor 433 does not change, so that Formula (12) is established.

$$Q\text{init}=Q\text{after}+Q2 \qquad (12)$$

When Formulas (9) to (11) are substituted into Formula (12), Formula (13) is obtained.

$$V\text{out}=-(C1/C2)\times(V\text{after}-V\text{init}) \qquad (13)$$

According to Formula (13), the differentiator 353 subtracts the optical voltages Vafter and Vinit, that is, calculates the difference signal Vout corresponding to the difference (Vafter −Vinit) between the optical voltages Vafter and Vinit.

According to Formula (13), the gain of subtraction by the differentiator 353 is C1/C2. Therefore, the differentiator 353 outputs, as the difference signal Vout, the voltage obtained by multiplying the change in the optical voltage Vo after resetting of the capacitor 433 by C1/C2. The difference signal Vout is output as the differential signal Sin.

The differentiator 353 outputs the differential signal Sin when the switch 434 is turned on and off by the row drive signal output from the row drive circuit 363.

Figure 25:
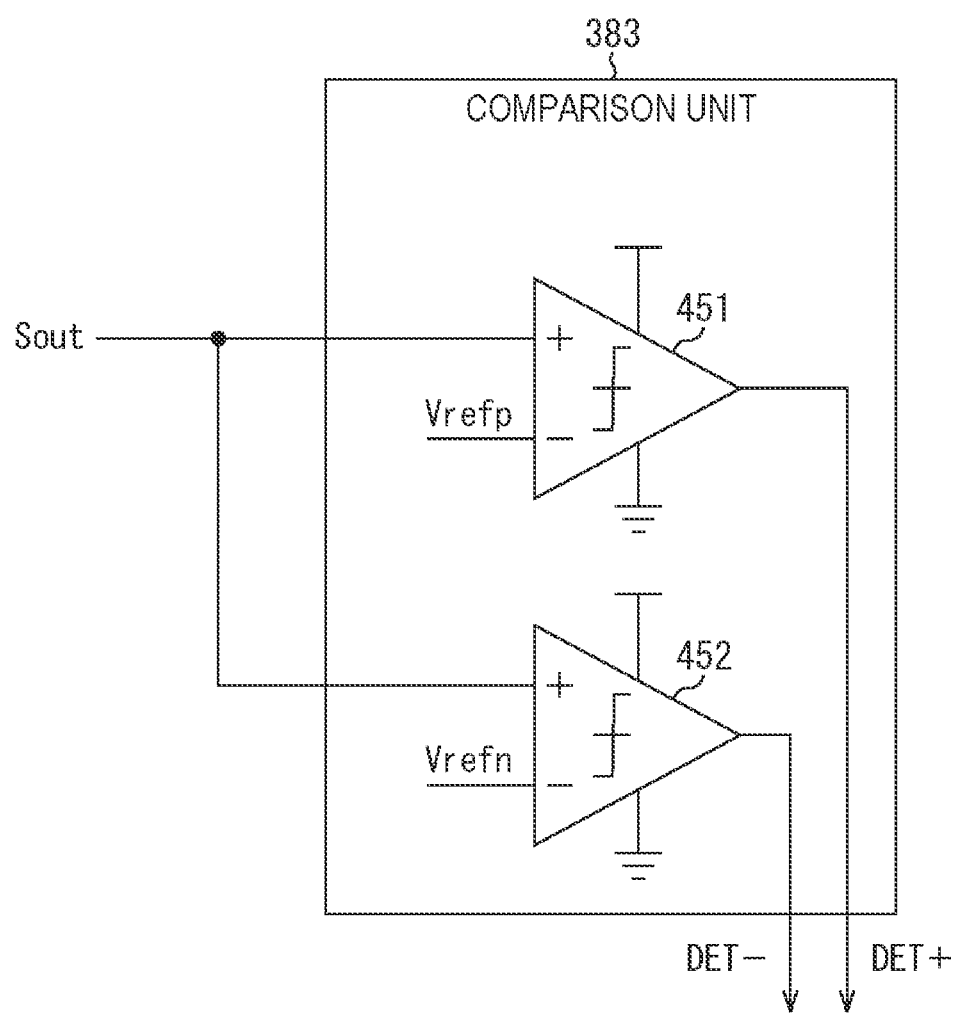
FIG. 25 is a diagram illustrating a configuration example of a comparison unit of the detection block in FIG. 23.

FIG. 25 illustrates a configuration example of the comparison unit 383 of the detection block 371 in FIG. 23.

The comparison unit 383 includes comparators 451 and 452. The comparison unit 383 is supplied with the + side threshold Vrefp and the − side threshold Vrefn from the sensitivity control unit 34 of the signal processing circuit 365 (signal processing circuit 12).

The comparator 451 compares the differential signal Sout from the selector 382 with the + side threshold Vrefp, and supplies a comparison result as the detection signal DET+ to the transfer circuit 384. The detection signal DET+ indicates whether or not the change amount of the luminance exceeds the + side threshold Vrefp.

The comparator 452 compares the differential signal Sout from the selector 382 with the − side threshold Vrefn, and supplies a comparison result as a detection signal DET− to the transfer circuit 384. The detection signal DET− indicates whether or not the change amount of the luminance exceeds the − side threshold Vrefn.

Figure 26:
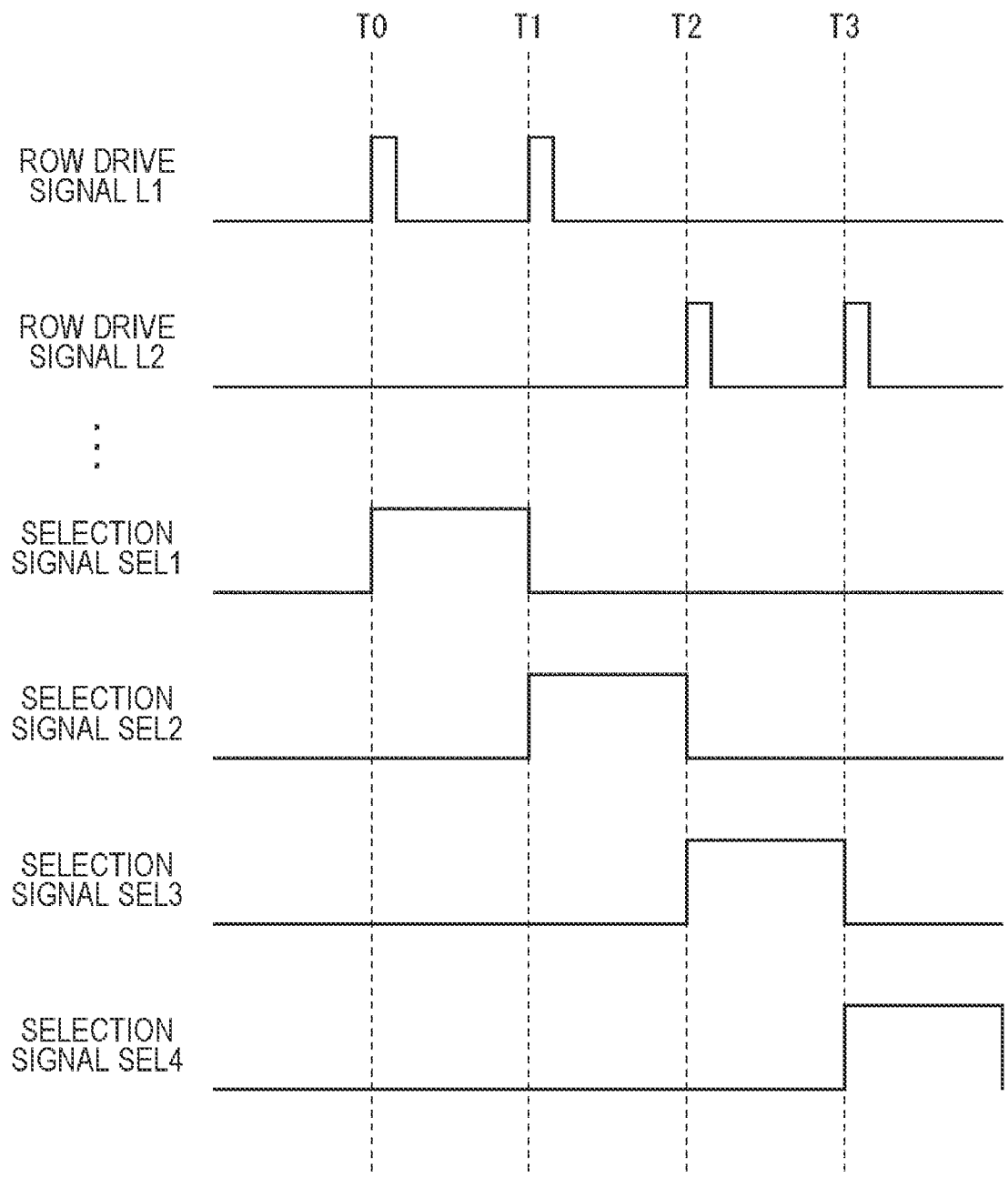
FIG. 26 is a timing chart illustrating a control example of a row drive circuit.

FIG. 26 is a timing chart illustrating a control example of the row drive circuit 363.

At timing T0, the row drive circuit 363 selects a first row by a row drive signal L1 and drives the differentiator 353 of the selected row. The capacitor 433 in the differentiator 353 in the first row is initialized by the row drive signal L1. Furthermore, the row drive circuit 363 supplies the selection signal SEL1 to the selector 382, and selects the upper left detection unit 381 in 2 rows×2 columns in the shared block 343 over a certain period. Therefore, the detection unit 381 in the odd-numbered column in the first row detects the presence or absence of an event.

Next, at timing T1, the row drive circuit 363 drives the differentiator 353 in the first row again by the row drive signal L1. Furthermore, the row drive circuit 363 selects the upper right detection unit 381 in 2 rows×2 columns in the shared block 343 over a certain period by the selection signal SEL2. Therefore, the detection unit 381 in the even-numbered column in the first row detects the presence or absence of an event.

At timing T2, the row drive circuit 363 drives the differentiator 353 in the second row by a row drive signal L2. The capacitor 433 in the differentiator 353 in the second row is initialized by the row drive signal L2. Furthermore, the row drive circuit 363 selects the lower left detection unit 381 in 2 rows×2 columns in the shared block 343 over a certain period by the selection signal SEL3. Therefore, the detection unit 381 in the odd-numbered column in the second row detects the presence or absence of an event.

Subsequently, at timing T3, the row drive circuit 363 drives the differentiator 353 in the second row again by the row drive signal L2. Furthermore, the row drive circuit 363 selects the lower right detection unit 381 in 2 rows×2 columns in the shared block 343 over a certain period by the selection signal SEL4. Therefore, the detection unit 381 in the even-numbered column in the second row detects the presence or absence of an event.

Similarly, the row drive circuit 363 sequentially selects the row in which the logarithmic response unit 310 is arranged, and drives the selected row by the row drive signal. Furthermore, each time a row is selected, the row drive circuit 363 sequentially selects each of the detection units 381 in the shared block 343 of the selected row by the selection signal SEL. For example, in a case where the detection units 381 of 2 rows×2 columns are arranged in the shared block 343, each time a row is selected, an odd column and an even column in the row are sequentially selected.

The above-described drive control is sequentially performed on the entire address event detection unit 362 (light receiving unit 341) in which the detection unit 381 is arranged, so that a change image indicating the presence or absence of a luminance change is generated at a predetermined frame rate and output to the signal processing circuit 365.

The signal processing circuit 365 acquires a change image output at a predetermined frame rate, determines whether a flicker of a predetermined cycle occurs, and, in a case where the flicker occurs, controls (adjusts) a threshold at the time of detecting a luminance change, that is, the + side threshold Vrefp and the − side threshold Vrefn.

9. Configuration Example of Electronic Device

The event detection sensor 1 described above can be mounted on an electronic device such as a smartphone, a tablet terminal, a mobile phone, a personal computer, a game machine, a television receiver, a wearable terminal, a digital still camera, or a digital video camera, for example.

Figure 27:
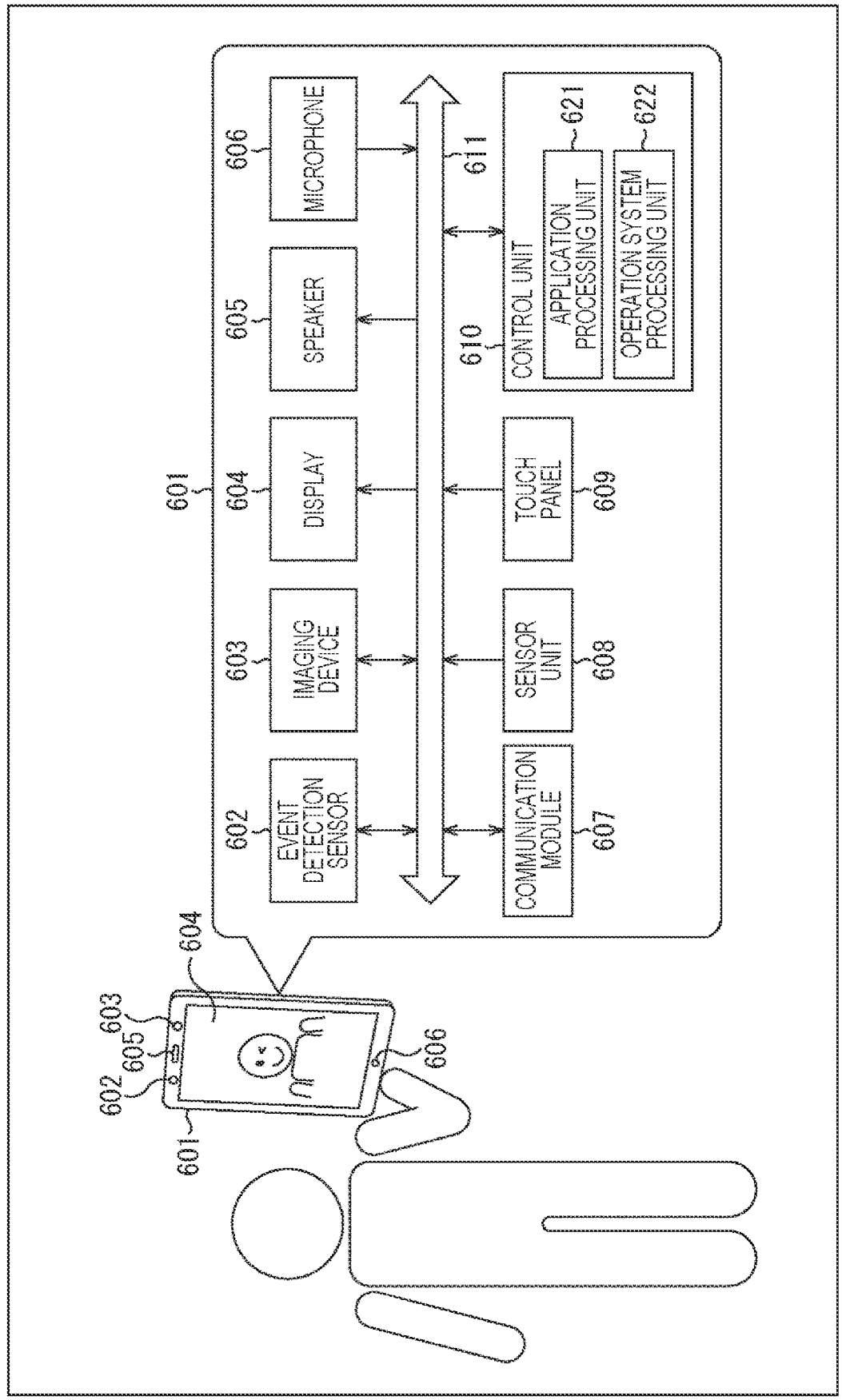
FIG. 27 is a block diagram illustrating a configuration example of a smartphone as an electronic device to which the present technology is applied.

FIG. 27 is a block diagram illustrating a configuration example of a smartphone as an electronic device mounted with an event detection sensor.

As illustrated in FIG. 27, the smartphone 601 is configured by connecting an event detection sensor 602, an imaging device 603, a display 604, a speaker 605, a microphone 606, a communication module 607, a sensor unit 608, a touch panel 609, and a control unit 610 via a bus 611. Furthermore, the control unit 610 has functions as an application processing unit 621 and an operation system processing unit 622 by a CPU executing a program.

The event detection sensor 1 in FIG. 1 is applied as the event detection sensor 602. For example, the event detection sensor 602 is arranged in front of the smartphone 601, and can detect and output, as an event, a luminance change of a subject such as a face, a hand, or a finger of the user of the smartphone 601. Note that the event detection sensor 602 may be arranged on the back surface of the smartphone 601.

The imaging device 603 is arranged in front of the smartphone 601, and performs imaging with the user of the smartphone 601 as a subject to acquire an image in which the user is captured. Note that although not illustrated, the imaging device 603 may also be arranged on the back surface of the smartphone 601.

The display 604 displays an operation screen for performing processing by the application processing unit 621 and the operation system processing unit 622, an image captured by the imaging device 603, and the like. The speaker 605 and the microphone 606 output the voice of the other party and collect the voice of the user, for example, when making a call using the smartphone 601.

The communication module 607 performs network communication via the Internet, a public telephone line network, a wide area communication network for a wireless mobile body such as a so-called 4G line or a 5G line, and a communication network such as a wide area network (WAN) or a local area network (LAN), short-range wireless communication such as Bluetooth (registered trademark) or near field communication (NFC), or the like. The sensor unit 608 senses a speed, an acceleration, a proximity, and the like, and the touch panel 609 acquires a touch operation by the user on an operation screen displayed on the display 604.

The application processing unit 621 performs a process for providing various services by the smartphone 601. For example, the application processing unit 621 can perform a process of causing the imaging device 603 to perform imaging and displaying an image obtained as a result of the imaging on the display 604 on the basis of the luminance change supplied from the event detection sensor 602. Furthermore, for example, the application processing unit 621 can perform a process of specifying a region of interest when the imaging device 603 performs imaging on the basis of the luminance change supplied from the event detection sensor 602.

The operation system processing unit 622 performs a process for realizing basic functions and operations of the smartphone 601. For example, the operation system processing unit 622 can perform a process of authenticating the face of the user and unlocking the smartphone 601 on the basis of the imaging result of the imaging device 603. Furthermore, the operation system processing unit 622 can perform, for example, a process of recognizing the gesture of the user on the basis of the imaging result of the imaging device 603 and a process of inputting various operations according to the gesture.

In the smartphone 601 configured as described above, when the event detection sensor 1 in FIG. 1 is applied as the event detection sensor 602, for example, it is possible to perform a process of detecting the movement or state change of a predetermined object or creating and displaying data of a place where a luminance change has occurred or the like.

10. Application Example to Mobile Body

The technology (present technology) according to the present disclosure can be applied to various products. For example, the technology according to the present disclosure may be realized as a device mounted on any type of mobile body such as an automobile, an electric vehicle, a hybrid electric vehicle, a motorcycle, a bicycle, a personal mobility, an airplane, a drone, a ship, and a robot.

Figure 28:
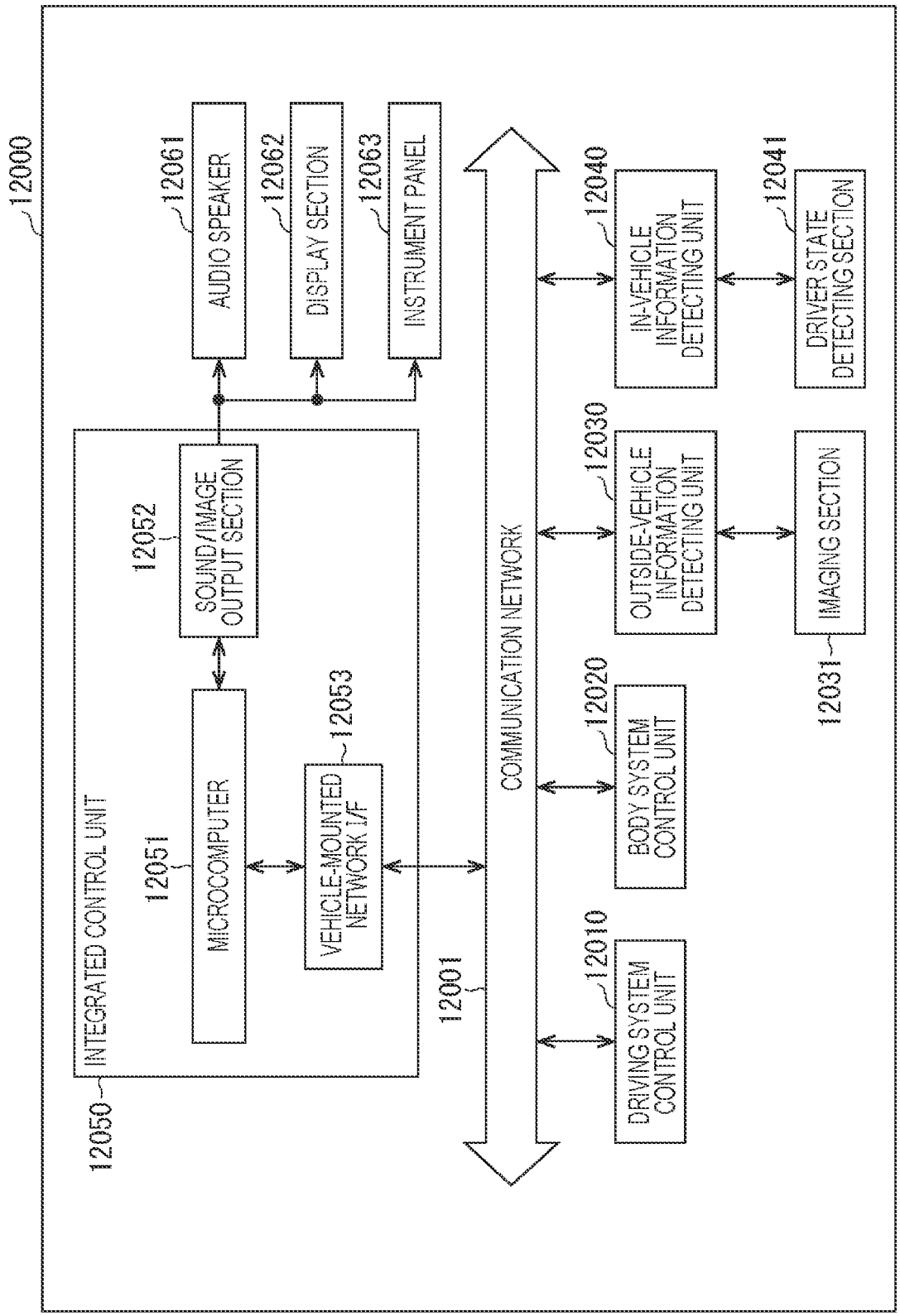
FIG. 28 is a block diagram illustrating an example of schematic configuration of a vehicle control system.

FIG. 28 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 28, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the information about the outside of the vehicle, the information being acquired by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 28, an audio speaker 12061, a display section 12062, and an instrument panel 12063 are illustrated as the output device. The display section 12062 may, for example, include at least one of an on-board display and a head-up display.

Figure 29:
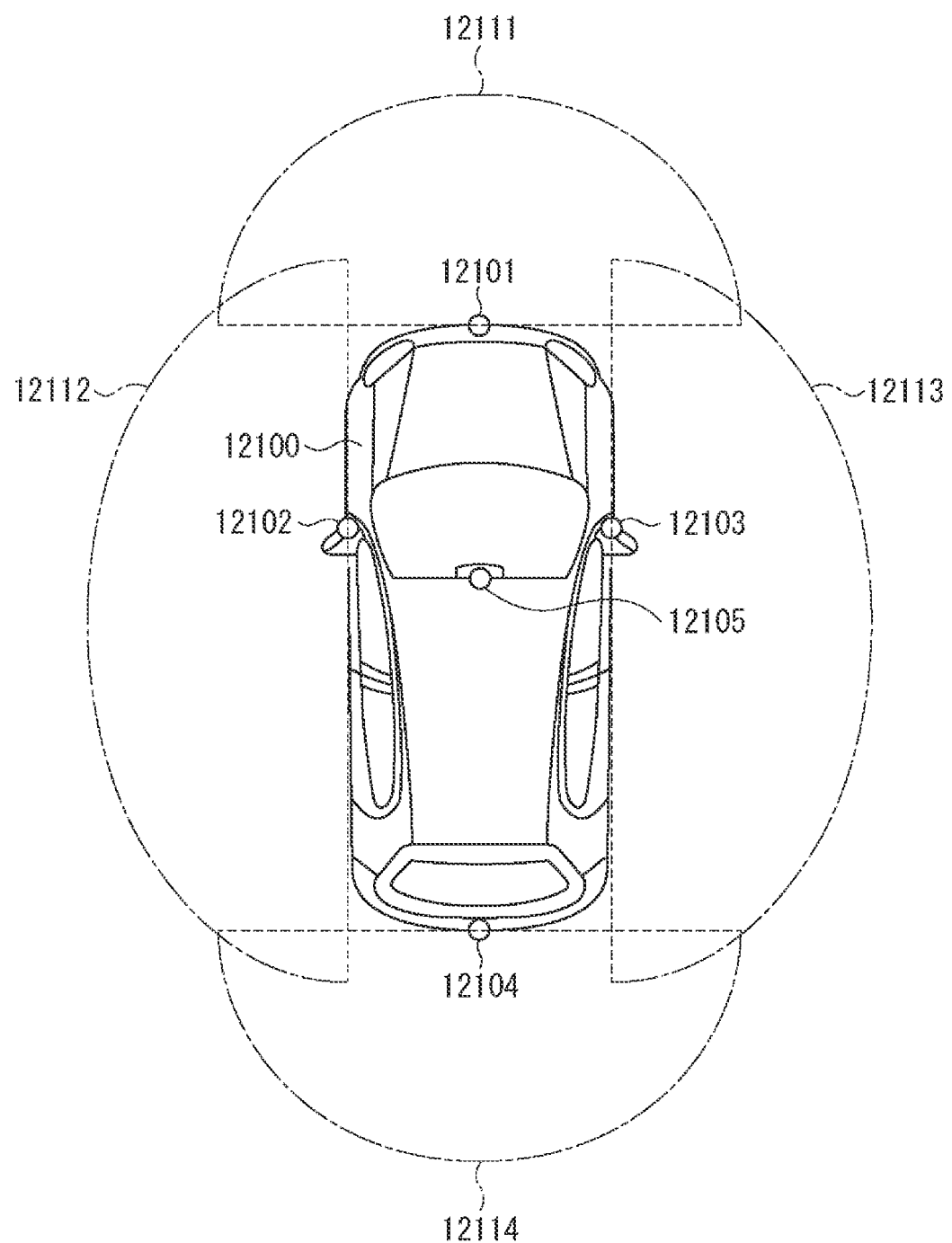
FIG. 29 is an explanatory diagram illustrating an example of installation positions of an outside-vehicle information detection part and an imaging section.

FIG. 29 is a diagram depicting an example of the installation position of the imaging section 12031.

In FIG. 29, a vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors acquire mainly an image of the sides of the vehicle 12100. The imaging section 12104 provided to the rear bumper or the back door obtains mainly an image of the rear of the vehicle 12100. The front images acquired by the imaging sections 12101 and 12105 are used mainly to detect a preceding vehicle, a pedestrian, an obstacle, a traffic light, a traffic sign, a lane, or the like.

Note that FIG. 29 illustrates an example of the imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the outside-vehicle information detecting unit 12030 and the in-vehicle information detecting unit 12040 among the configurations described above. Specifically, when the event detection sensor 1 and the imaging device 300 are mounted as the outside-vehicle information detecting unit 12030 and the in-vehicle information detecting unit 12040, it is possible to perform a process of detecting the operation of the driver or detect a change in the situation outside the vehicle and reflect the change in the vehicle control.

The embodiments of the present technology are not limited to the above-described embodiments, and various modifications can be made without departing from the gist of the present technology.

For example, a mode in which all or some of the plurality of configuration examples described above are combined can be adopted.

Furthermore, each step described in the above-described flowcharts can be executed by one device, or shared and executed by a plurality of devices.

Moreover, in a case where one step includes a plurality of processes, the plurality of processes included in the one step can be executed by one device, or shared and executed by a plurality of devices.

Note that the effects described in the present specification are merely examples and are not limited, and effects other than those described in the present specification may be provided.

Note that the present technology can have the following configurations.

(1)

A signal processing device including:
- a count unit that counts a first count number, which is a count number of pixels in which a first luminance change in a positive direction is detected, and a second count number, which is a count number of pixels in which a second luminance change in a negative direction is detected, in an image output from a light receiving unit at a predetermined frame rate and indicating a luminance change;
- a coefficient generation unit that generates a coefficient corresponding to a time at which the luminance change is detected; and
- an integrating unit that integrates a multiplication result of the count number of the pixels and the coefficient.

(2)

The signal processing device according to (1), further including:
- a subtraction unit that subtracts the second count number from the first count number, in which
- the integrating unit integrates a multiplication result of a subtraction result of the subtraction unit and the coefficient.

(3)

The signal processing device according to (1) or (2), in which
- the coefficient generation unit generates a coefficient corresponding to the time based on the predetermined frame rate.

(4)

The signal processing device according to any one of (1) to (3), in which
- the integrating unit integrates the multiplication result by an integral multiple of the number of frames corresponding to a cycle to be detected.

(5)

The signal processing device according to any one of (1) to (4), in which the coefficient generation unit generates, as the coefficients, values of a sin function and a cos function corresponding to the time.

(6)

The signal processing device according to (5), in which the integrating unit multiplies each of the values of the sin function and the cos function by the count number of the pixels to calculate the multiplication result.

(7)

The signal processing device according to (5) or (6), in which
the coefficient generation unit generates, as the coefficients, values of the sin function and the cos function corresponding to a cycle to be detected.

(8)

The signal processing device according to any one of (5) to (7), in which
the coefficient generation unit generates, as the coefficients, values of a sin approximation function and a cos approximation function obtained by approximating the sin function and the cos function.

(9)

The signal processing device according to (8), in which the sin approximation function and the cos approximation function are functions obtained by approximating the sin function and the cos function to signals having binary values of 1 and −1.

(10)

The signal processing device according to (9), in which the coefficient generation unit outputs 1 or −1 on the basis of a table in which 1 or −1 is associated with the time.

(11)

The signal processing device according to any one of (1) to (10), in which
a flicker amount estimation unit that estimates a flicker amount in which the luminance change occurs at a specific frequency on the basis of an integration result of the integrating unit.

(12)

The signal processing device according to (11), in which
a control unit that controls a sensitivity parameter of the light receiving unit on the basis of an estimation result of the flicker amount estimation unit.

(13)

The signal processing device according to (12), in which
the control unit separately controls the first luminance change and the second luminance change in the sensitivity parameter of the light receiving unit.

(14)

The signal processing device according to (12) or (13), in which
the control unit controls the sensitivity parameter of the light receiving unit for every phase of a cycle to be detected.

(15)

A signal processing method performed by a signal processing device, the method including:
counting a first count number, which is a count number of pixels in which a first luminance change in a positive direction is detected, and a second count number, which is a count number of pixels in which a second luminance change in a negative direction is detected, in an image output from a light receiving unit at a predetermined frame rate and indicating a luminance change;
generating a coefficient corresponding to a time at which the luminance change is detected; and
integrating a multiplication result of the count number of the pixels and the coefficient.

(16)

A detection sensor including:
a light receiving unit in which pixels that perform photoelectric conversion of incident light and generate electric signals are arranged in a lattice pattern;
a count unit that counts a first count number, which is a count number of pixels in which a first luminance change in a positive direction is detected, and a second count number, which is a count number of pixels in which a second luminance change in a negative direction is detected, in an image output from the light receiving unit at a predetermined frame rate and indicating a luminance change;
a coefficient generation unit that generates a coefficient corresponding to a time at which the luminance change is detected; and
an integrating unit that integrates a multiplication result of the count number of the pixels and the coefficient.

REFERENCE SIGNS LIST

1 Event detection sensor
11 Pixel array unit
12 Signal processing circuit
21 Pixel
22 Detection circuit
31 Event data acquisition unit
32 Event count unit
33 Flicker detection unit
34 Sensitivity control unit
51 Subtractor
52 Convolution coefficient generation unit
53 Integrating unit
54 Flicker amount estimation unit
71, 72 Multiplier
73, 74 Integrator
75, 76 Output unit
151 Positive control value generation unit
152 Negative control value generation unit
171 Minimum value detection unit
172 DR calculation unit
173 Comparison unit
174 Update determination unit
181 Minimum value detection unit
182 DR calculation unit
183 Comparison unit
184 Update determination unit
300 Imaging device
312 Imaging element
601 Smartphone
602 Event detection sensor
603 Imaging device

The invention claimed is:

1. A signal processing device comprising:
a count unit that counts a first count number, which is a count number of pixels in which a first luminance change in a positive direction is detected, and a second count number, which is a count number of pixels in which a second luminance change in a negative direction is detected, in an image output from a light receiving unit at a predetermined frame rate and indicating a luminance change;
a coefficient generation unit that generates a coefficient corresponding to a time at which the luminance change is detected; and an integrating unit that integrates a multiplication result of the count number of the pixels and the coefficient, wherein the count unit, the coefficient generation unit, and the integrating unit are each implemented via at least one processor.

2. The signal processing device according to claim 1, further comprising:

a subtraction unit that subtracts the second count number from the first count number, wherein the integrating unit integrates a multiplication result of a subtraction result of the subtraction unit and the coefficient, and the subtraction unit is implemented via at least one processor.

3. The signal processing device according to claim 1, wherein the coefficient generation unit generates a coefficient corresponding to the time based on the predetermined frame rate.

4. The signal processing device according to claim 1, wherein the integrating unit integrates the multiplication result by an integral multiple of the number of frames corresponding to a cycle to be detected.

5. The signal processing device according to claim 1, wherein the coefficient generation unit generates, as the coefficients, values of a sin function and a cos function corresponding to the time.

6. The signal processing device according to claim 5, wherein the integrating unit multiplies each of the values of the sin function and the cos function by the count number of the pixels to calculate the multiplication result.

7. The signal processing device according to claim 5, wherein the coefficient generation unit generates, as the coefficients, values of the sin function and the cos function corresponding to a cycle to be detected.

8. The signal processing device according to claim 5, wherein the coefficient generation unit generates, as the coefficients, values of a sin approximation function and a cos approximation function obtained by approximating the sin function and the cos function.

9. The signal processing device according to claim 8, wherein the sin approximation function and the cos approximation function are functions obtained by approximating the sin function and the cos function to signals having binary values of 1 and −1.

10. The signal processing device according to claim 9, wherein the coefficient generation unit outputs 1 or −1 on a basis of a table in which 1 or −1 is associated with the time.

11. The signal processing device according to claim 1, further comprising:

a flicker amount estimation unit that estimates a flicker amount in which the luminance change occurs at a specific frequency on a basis of an integration result of the integrating unit, wherein the flicker amount estimation unit is implemented via at least one processor.

12. The signal processing device according to claim 11, further comprising:

a control unit that controls a sensitivity parameter of the light receiving unit on a basis of an estimation result of the flicker amount estimation unit, wherein the control unit is implemented via at least one processor.

13. The signal processing device according to claim 12, wherein the control unit separately controls the first luminance change and the second luminance change in the sensitivity parameter of the light receiving unit.

14. The signal processing device according to claim 12, wherein the control unit controls the sensitivity parameter of the light receiving unit for every phase of a cycle to be detected.

15. A signal processing method performed by a signal processing device, the method comprising:

counting a first count number, which is a count number of pixels in which a first luminance change in a positive direction is detected, and a second count number, which is a count number of pixels in which a second luminance change in a negative direction is detected, in an image output from a light receiving unit at a predetermined frame rate and indicating a luminance change;

generating a coefficient corresponding to a time at which the luminance change is detected; and integrating a multiplication result of the count number of the pixels and the coefficient.

16. A detection sensor comprising:

a light receiving unit in which pixels that perform photoelectric conversion of incident light and generate electric signals are arranged in a lattice pattern;

a count unit that counts a first count number, which is a count number of pixels in which a first luminance change in a positive direction is detected, and a second count number, which is a count number of pixels in which a second luminance change in a negative direction is detected, in an image output from the light receiving unit at a predetermined frame rate and indicating a luminance change;

a coefficient generation unit that generates a coefficient corresponding to a time at which the luminance change is detected; and an integrating unit that integrates a multiplication result of the count number of the pixels and the coefficient, wherein the count unit, the coefficient generation unit, and the integrating unit are each implemented via at least one processor.

* * * * *